(12) United States Patent
Morooka et al.

(10) Patent No.: US 9,383,558 B2
(45) Date of Patent: Jul. 5, 2016

(54) ZOOM LENS AND IMAGE PICKUP APPARATUS USING THE SAME

(71) Applicant: OLYMPUS CORPORATION, Tokyo (JP)

(72) Inventors: Masaru Morooka, Tokyo (JP); Toyoki Kon, Tokyo (JP); Masahiro Imamura, Tokyo (JP); Minoru Ueda, Kanagawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/837,504

(22) Filed: Aug. 27, 2015

(65) Prior Publication Data
US 2015/0370051 A1    Dec. 24, 2015

Related U.S. Application Data

(62) Division of application No. 14/303,938, filed on Jun. 13, 2014, now Pat. No. 9,154,705.

(30) Foreign Application Priority Data

Jun. 13, 2013 (JP) .................................. 2013-124619

(51) Int. Cl.
| | |
|---|---|
| G02B 9/60 | (2006.01) |
| G02B 15/16 | (2006.01) |
| G02B 27/64 | (2006.01) |
| H04N 5/232 | (2006.01) |
| G02B 15/173 | (2006.01) |
| G02B 13/00 | (2006.01) |

(52) U.S. Cl.
CPC .............. *G02B 15/16* (2013.01); *G02B 13/009* (2013.01); *G02B 15/173* (2013.01); *G02B 27/646* (2013.01); *H04N 5/23296* (2013.01)

(58) Field of Classification Search
CPC .................................................. G02B 13/0045
USPC ......................................... 359/676, 714, 766
See application file for complete search history.

(56) References Cited

U.S. PATENT DOCUMENTS

| | | | |
|---|---|---|---|
| 8,228,620 B2 | 7/2012 | Ohtake et al. | |
| 8,493,666 B2 | 7/2013 | Ito | |
| 2009/0244720 A1* | 10/2009 | Yamaguchi | G02B 15/14 359/690 |
| 2011/0085248 A1 | 4/2011 | Ohtake et al. | |
| 2012/0087016 A1 | 4/2012 | Ito | |

FOREIGN PATENT DOCUMENTS

| | | |
|---|---|---|
| JP | 2011-075985 | 4/2011 |
| JP | 2012-098699 | 5/2012 |

* cited by examiner

*Primary Examiner* — James Jones
(74) *Attorney, Agent, or Firm* — Kenyon & Kenyon LLP

(57) ABSTRACT

A zoom lens comprising, a first lens unit having a positive refractive power, a second lens unit having a negative refractive power, a third lens unit having a positive refractive power, a fourth lens unit having a negative refractive power, and a fifth lens unit having a positive refractive power. Each distance between the first lens unit and the second lens unit, between the third lens unit and the fourth lens unit, and between the fourth lens unit and the fourth lens unit at the telephoto end is longer than at the wide angle end, and a distance between the second lens unit and the third lens unit at the telephoto end is shorter than at the wide angle end, and the following conditional expressions are satisfied.

$2 < mg_{3t}/mg_{3w} < 6$ $1.2 < mg_{5t}/mg_{5w} < 4$ $0.02 < f_5/f_t < 0.12$

38 Claims, 16 Drawing Sheets

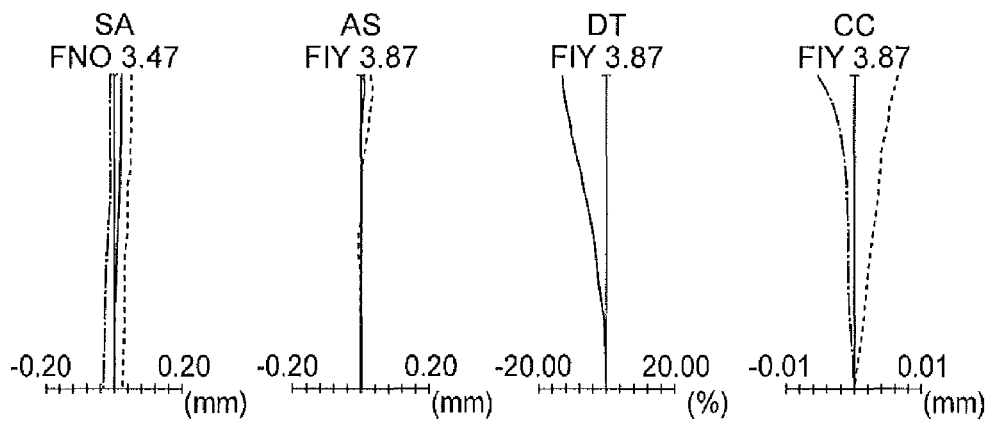
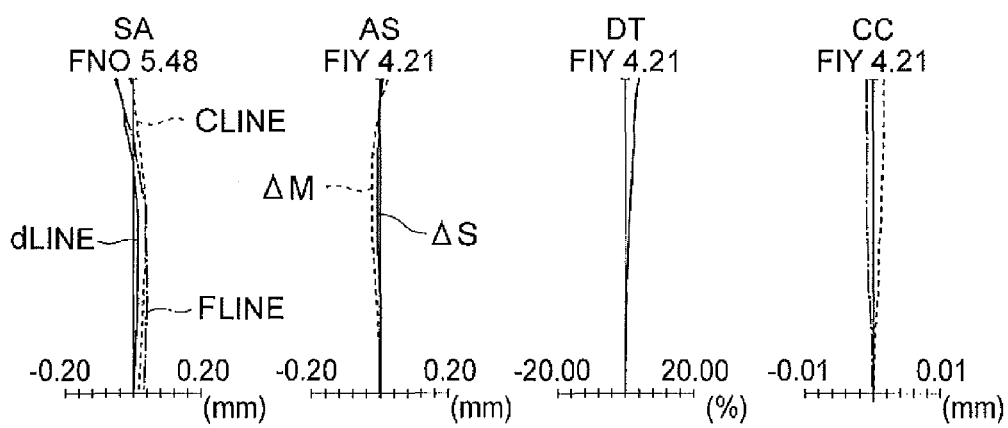
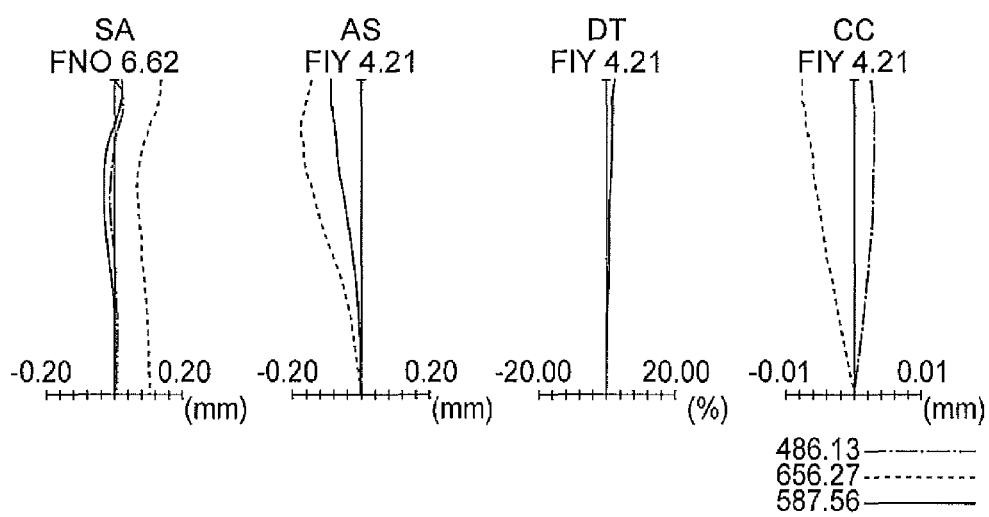

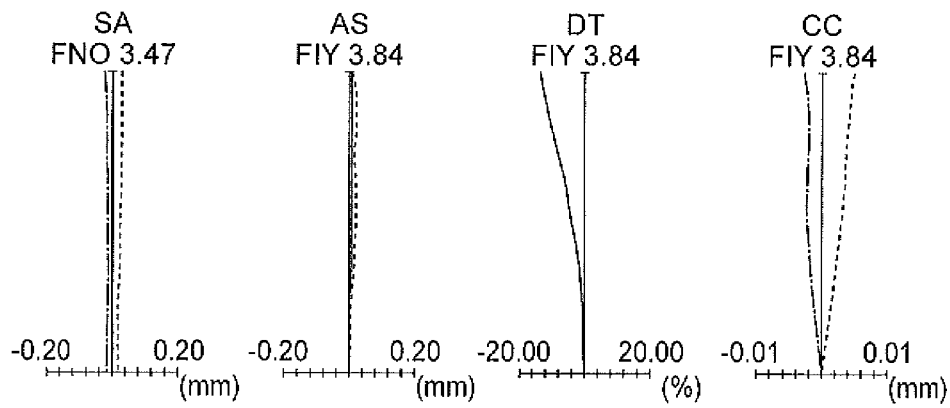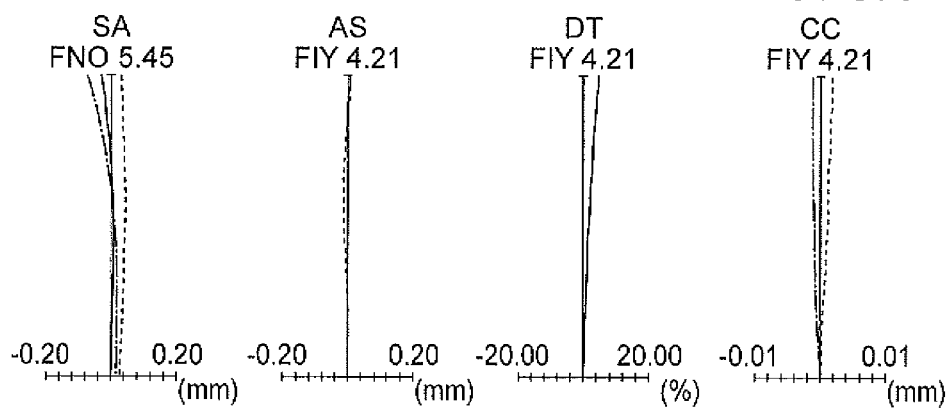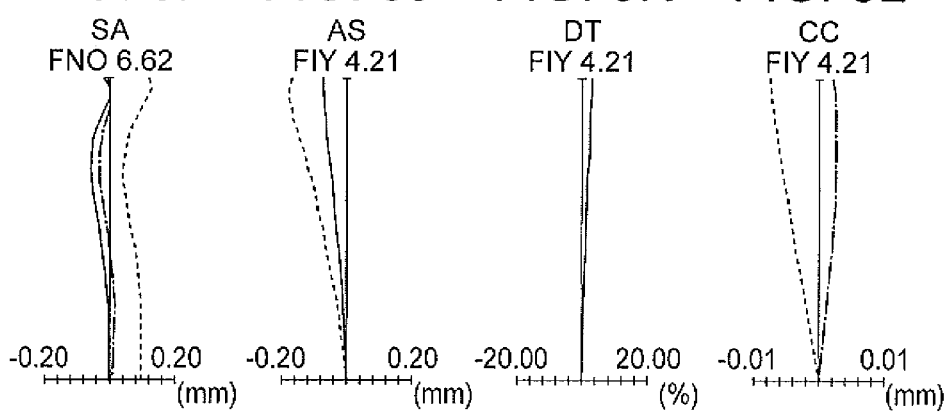

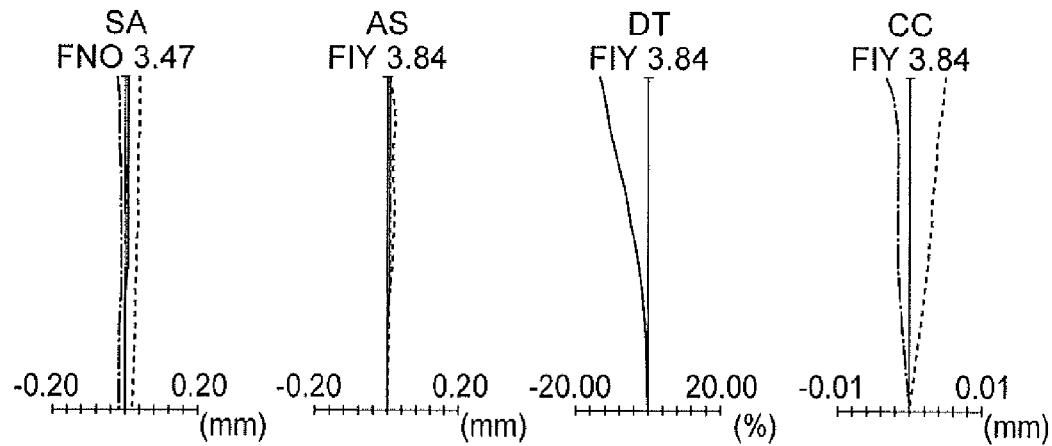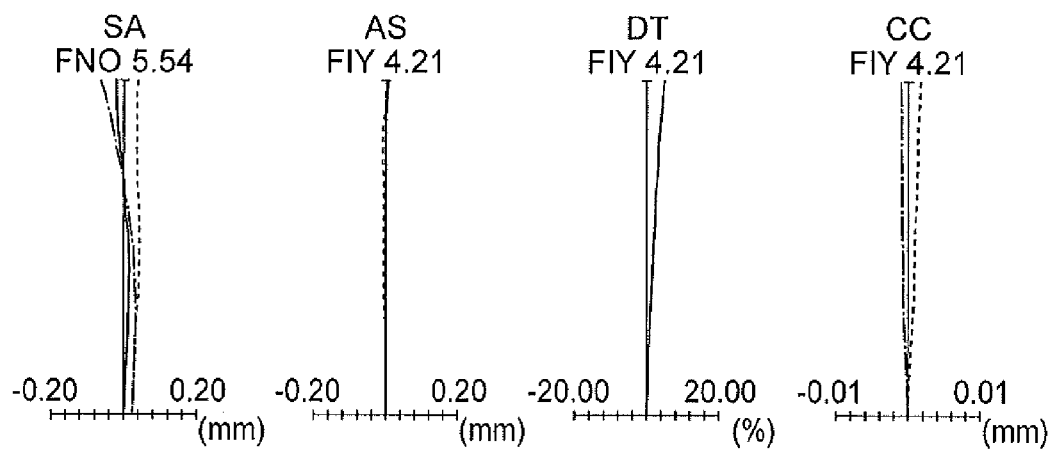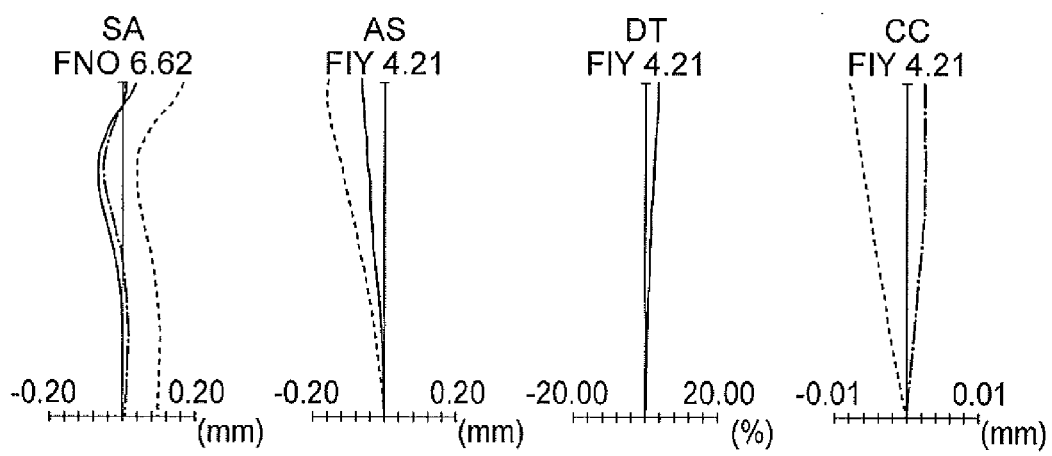

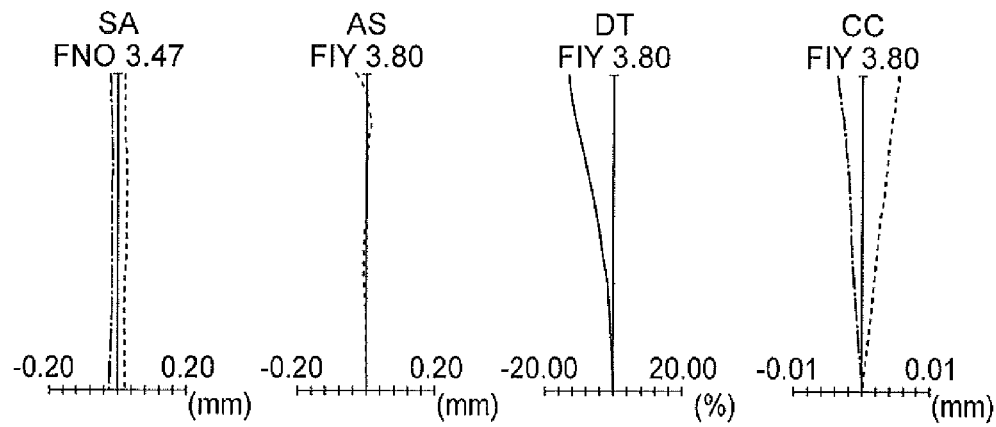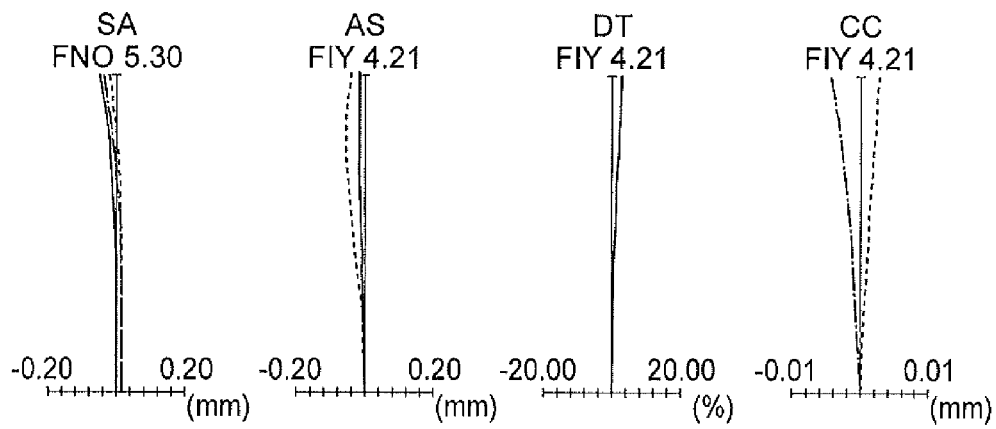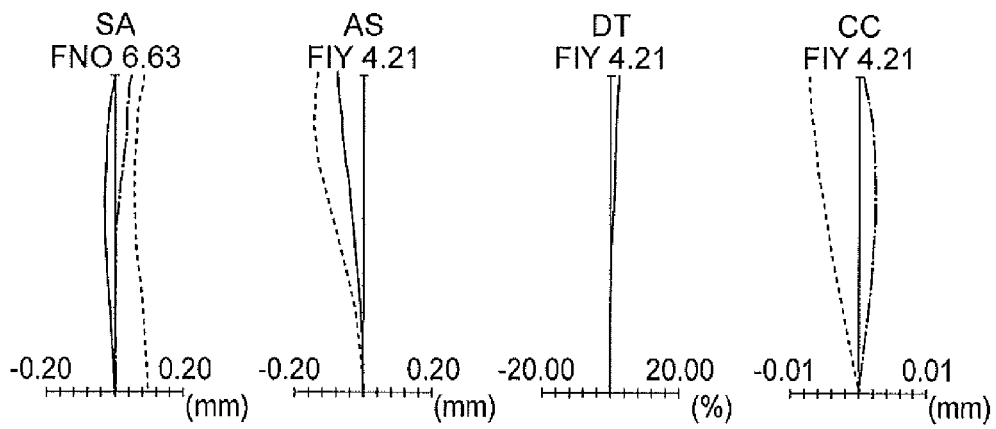

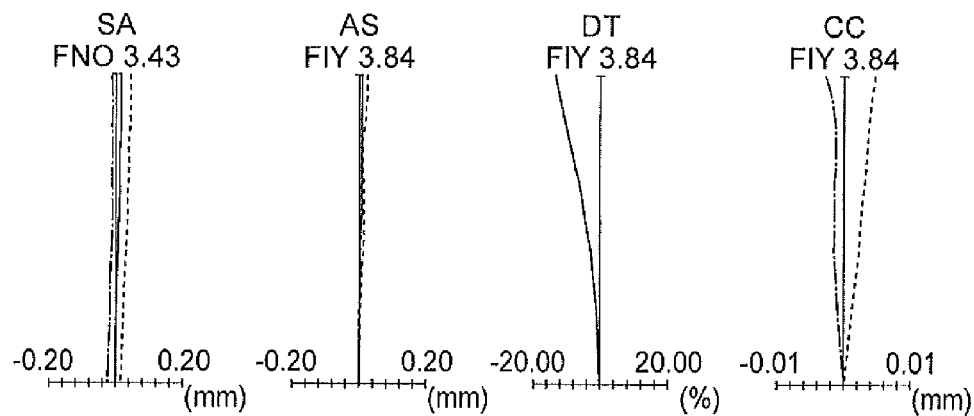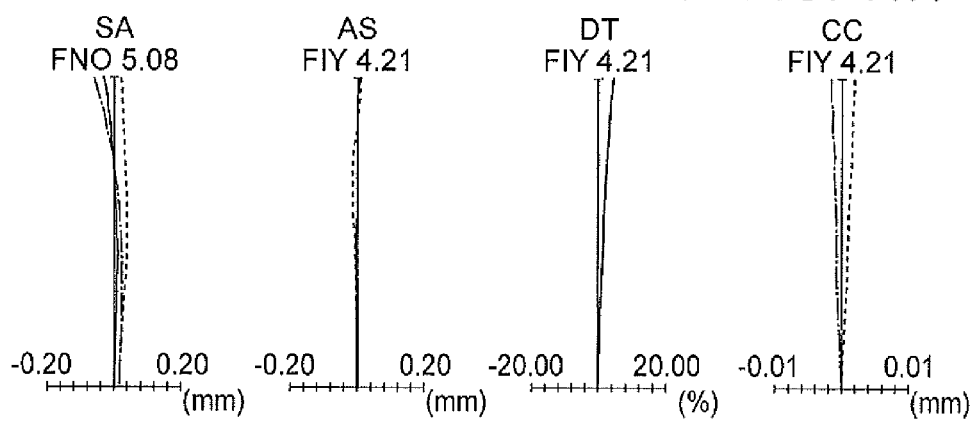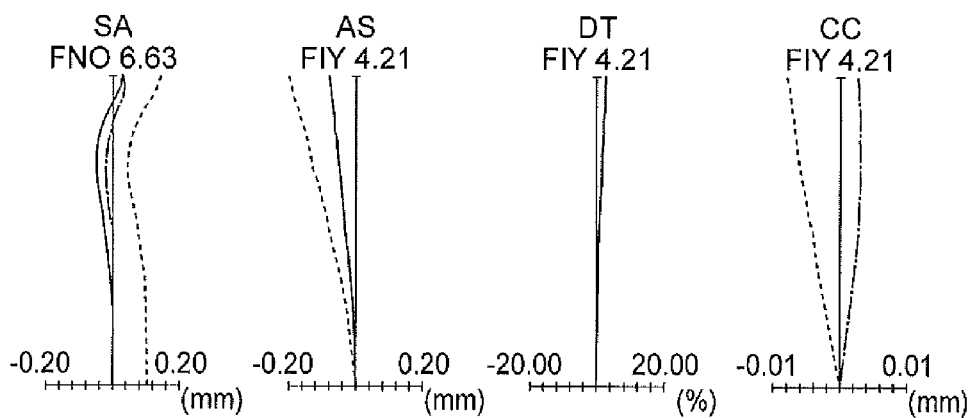

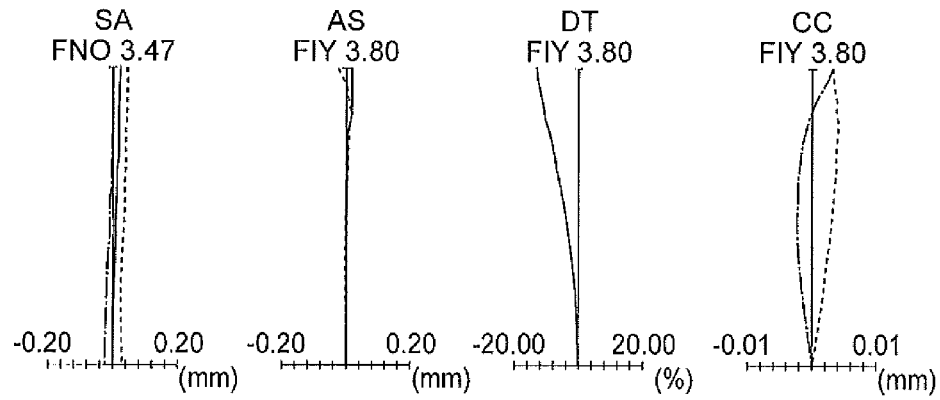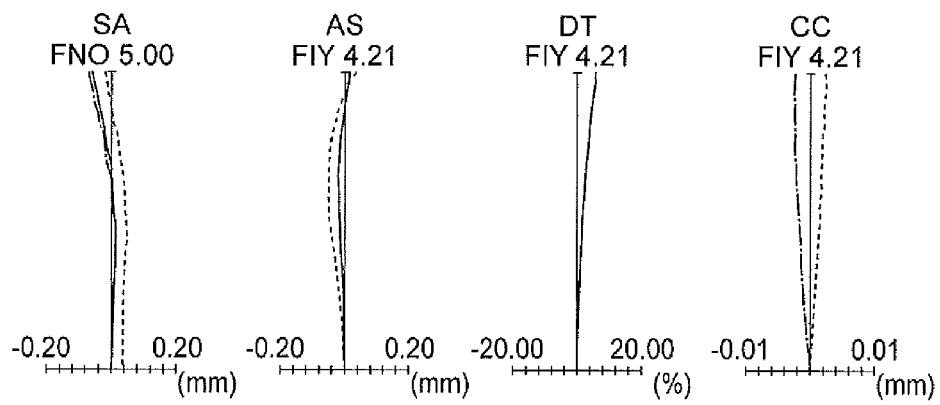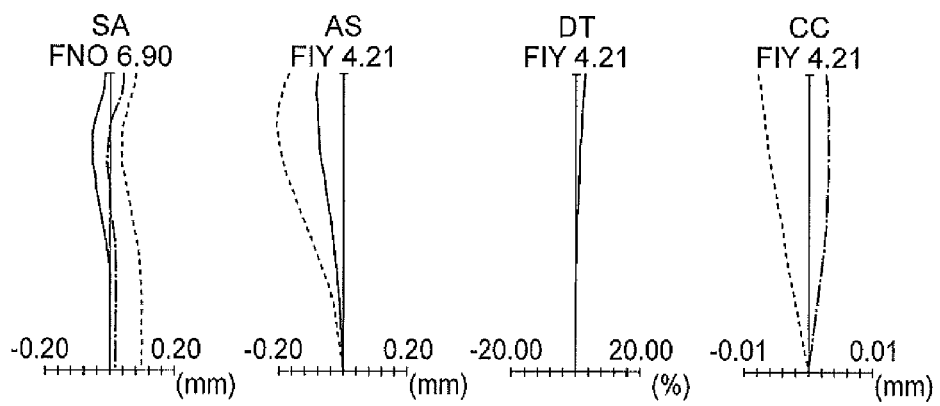

ZOOM LENS AND IMAGE PICKUP APPARATUS USING THE SAME

CROSS-REFERENCE TO RELATED APPLICATION

The present application is a divisional of U.S. patent application Ser. No. 14/303,938 filed on Jun. 13, 2014, which is based upon and claims the benefit of priority from the prior Japanese Patent Application No. 2013-124619 filed on Jun. 13, 2013; the entire contents of which are incorporated herein by reference.

BACKGROUND OF THE INVENTION

1. Field of the Invention

The present invention relates to a zoom lens and an image pickup apparatus using the same.

2. Description of the Related Art

In recent years, in video cameras and digital cameras, small-sizing and slimming of a zoom lens have been progressing. Moreover, with a spread of photography applications, in addition to fulfil the requirement of small-sizing and slimming, widening of an angle of view and high zooming ratio, have been sought.

Zoom lenses fulfilling such requirements have been disclosed in Japanese Patent Application Laid-open Publication Nos. 2011-75985 and 2012-98699. The zoom lenses in Japanese Patent Application Laid-open Publication Nos. 2011-75985 and 2012-98699 are zoom lenses of a type having five or more than five lens units. Here, refractive power of each lens unit in order from an object side is a positive refractive power, a negative refractive power, a positive refractive power, a negative refractive power, and a positive refractive power.

In the zoom lens disclosed in an example 1 of Japanese Patent Application Laid-open Publication No. 2011-75985, a telephoto ratio at a telephoto end (a ratio of an overall length of the lens to a focal length of (at) the telephoto end) is about 0.87, and a zooming ratio is about 34. In the zoom lens disclosed in an example 1 and an example 5 of Japanese Patent Application Laid-open Publication No. 2012-98699, the telephoto ratio is about 1.05 and the zooming ratio is about 41.

Small-sizing and high zooming ratio are demanded in a zoom lens, and further improvements are sought to achieve both demands. Also, with the achievement of high zooming ratio, suppressing an effect of camera-shake is sought. Moreover, improvements for maintaining a favorable optical performance are sought, even when a high zooming ratio is achieved. The favorable optical performance means that occurrence of various aberrations is suppressed sufficiently.

SUMMARY OF THE INVENTION

A zoom lens according to a first aspect of the present invention comprising in order from an object side to an image side:

a first lens unit having a positive refractive power,
a second lens unit having a negative refractive power,
a third lens unit having a positive refractive power,
a fourth lens unit having a negative refractive power, and
a fifth lens unit having a positive refractive power, and
at the time of zooming, each of the first lens unit, the second lens unit, the third lens unit, the fourth lens unit, and the fifth lens unit moves to change distances between the lens units, and a distance between the first lens unit and the second lens unit at a telephoto end is longer than a distance between the first lens unit and the second lens unit at a wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end, and the following conditional expressions (1), (2), and (3) are satisfied.

$$2 < mg_{3t}/mg_{3w} < 6 \quad (1)$$

$$1.2 < mg_{5t}/mg_{5w} < 4 \quad (2)$$

$$0.02 < f_5/f_t < 0.12 \quad (3)$$

where, $mg_{3w}$ denotes a lateral magnification of the third lens unit at the wide angle end, $mg_{3t}$ denotes a lateral magnification of the third lens unit at the telephoto end, $mg_{5w}$ denotes a lateral magnification of the fifth lens unit at the wide angle end, $mg_{5t}$ denotes a lateral magnification of the fifth lens unit at the telephoto end, $f_5$ denotes a focal length of the fifth lens unit, and $f_t$ denotes a focal length of the overall zoom lens system at the telephoto end.

A zoom lens according to a second aspect of the present invention comprising in order from an object side to an image side:

a first lens unit having a positive refractive power,
a second lens unit having a negative refractive power,
a third lens unit having a positive refractive power,
a fourth lens unit having a negative refractive power, and
a fifth lens unit having a positive refractive power, and
at the time of zooming, each of the first lens unit, the second lens unit, the third lens unit, the fourth lens unit, and the fifth lens unit moves to change distances between the lens units, and when there is a camera-shake, an image blur on an image plane is corrected by moving the third lens unit in a direction orthogonal to an optical axis, and the following conditional expressions (4) and (5) are satisfied.

$$0.02 < f_3/f_t < 0.1 \quad (4)$$

$$1.5 < (1 - mg_{3t}) \times mg_{4t} \times mg_{5t} < 7.0 \quad (5)$$

where, $f_3$ denotes a focal length of the third lens unit, $f_t$ denotes a focal length of the overall zoom lens system at a telephoto end, $mg_{3t}$ denotes a lateral magnification of the third lens unit at the telephoto end, $mg_{4t}$ denotes a lateral magnification of the fourth lens unit at the telephoto end, and $mg_{5t}$ denotes a lateral magnification of the fifth lens unit at the telephoto end.

A zoom lens according to a third aspect of the present invention comprising in order from an object side to an image side:

a first lens unit having a positive refractive power,
a second lens unit having a negative refractive power,
a third lens unit having a positive refractive power,
a fourth lens unit having a negative refractive power, and
a fifth lens unit having a positive refractive power, and
at the time of zooming, each of the first lens unit, the second lens unit, the third lens unit, the fourth lens unit, and the fifth lens unit moves to change distances between the lens units, and a distance between the first lens unit and the second lens unit at a telephoto end is longer than a distance between the first lens unit and the second lens unit at a wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end, and the first lens unit includes a negative lens which satisfies the following conditional expressions (6) and (8), and a positive lens which satisfies the following conditional expression (7), and the first lens unit includes a cemented lens having a negative lens and a positive lens, and at least one positive lens, and the following conditional expression (9) is satisfied.

$$vd_{1n} < 50 \quad (6)$$

$$80 < vd_{1p} \quad (7)$$

$$\theta gF_{1n} < -0.00266 vd_{1n} + 0.68107 \quad (8)$$

$$-0.15 < f_1/f_{1c} < 0.15 \quad (9)$$

where, $vd_{1n}$ denotes Abbe's number for a d-line of at least one negative lens in the first lens unit, $vd_{1p}$ denotes Abbe's number for the d-line of at least one positive lens in the first lens unit, $\theta gF_{1n}$ denotes a partial dispersion ratio for a g-line and an F-line of at least one negative lens in the first lens unit, $f_1$ denotes a focal length of the first lens unit, $f_{1c}$ denotes a focal length of the cemented lens in the first lens unit, Abbe's number $vd_{1n}$ is indicated by $vd_{1n} = (nd_{1n} - 1)/(nF_{1n} - nC_{1n})$.

Abbe's number $vd_{1p}$ is indicated by $vd_{1p} = (nd_{1p} - 1)/(nF_{1p} - nC_{1p})$, the partial dispersion ratio $\theta gF_{1n}$ is indicated by $\theta gF_{1n} = (ng_{1n} - nF_{1n})/(nF_{1n} - nC_{1n})$.

$nd_{1n}$, $ng_{1n}$, $nF_{1n}$, and $nC_{1n}$ are refractive indices for the d-line, the g-line, the F-line, and a C-line respectively, of at least one negative lens in the first lens unit, and $nd_{1p}$, $ng_{1p}$, $nF_{1p}$, and $nC_{1p}$ are refractive indices for the d-line, the g-line, the F-line, and the C-line respectively, of at least one positive lens in the first lens unit.

Moreover, an image pickup apparatus according to the present invention comprising:

a zoom lens, and an image pickup element, which has an image pickup surface, and which converts an image formed on the image pickup surface by the zoom lens, to an electric image, and the zoom lens is one of the abovementioned zoom lenses.

BRIEF DESCRIPTION OF THE DRAWINGS

FIG. 1A shows a cross-sectional view at a wide angle end, FIG. 1B shows a cross-sectional view in an intermediate focal length state 2, and FIG. 1C shows a cross-sectional view at a telephoto end;

FIG. 2A shows a cross-sectional view at a wide angle end, FIG. 2B shows a cross-sectional view in an intermediate focal length state 2, and FIG. 2C shows a cross-sectional view at a telephoto end;

FIG. 3A shows a cross-sectional view at a wide angle end, FIG. 3B shows a cross-sectional view in an intermediate focal length state 2, and FIG. 3C shows a cross-sectional view at a telephoto end;

FIG. 4A shows a cross-sectional view at a wide angle end, FIG. 4B shows a cross-sectional view in an intermediate focal length state 2, and FIG. 4C shows a cross-sectional view at a telephoto end;

FIG. 5A shows a cross-sectional view at a wide angle end, FIG. 5B shows a cross-sectional view in an intermediate focal length state 2, and FIG. 5C shows a cross-sectional view at a telephoto end;

FIG. 6A shows a cross-sectional view at a wide angle end, FIG. 6B shows a cross-sectional view in an intermediate focal length state 2, and FIG. 6C shows a cross-sectional view at a telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of infinite object point focusing of the zoom lens according to the example 1;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens according to the example 2;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the zoom lens according to the example 3;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens according to the example 4;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the zoom lens according to the example 5;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the zoom lens according to the example 6;

DETAILED DESCRIPTION OF THE INVENTION

Figure 1A:
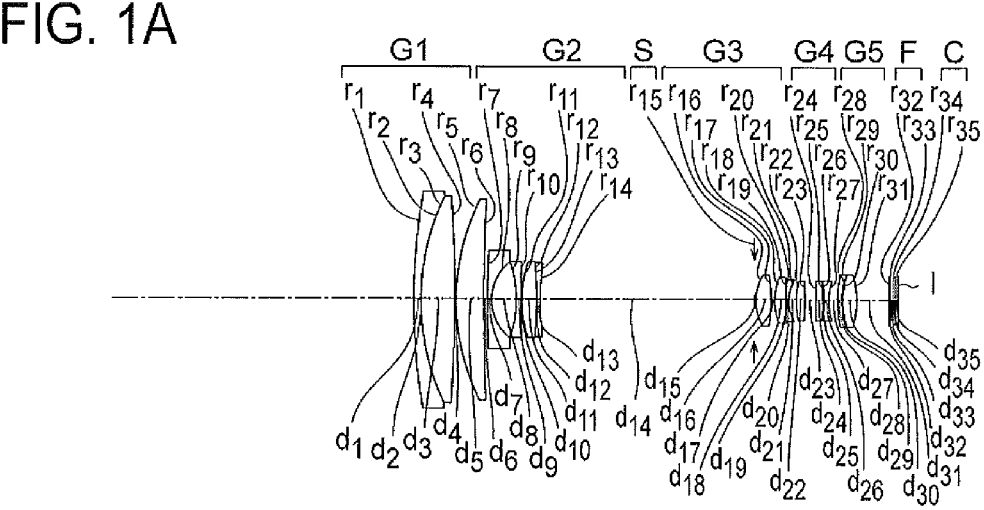
FIG. 1A, FIG. 1B, and FIG. 1C are lens cross-sectional views at the time of infinite object point focusing of a zoom lens according to an example 1, where.

Exemplary embodiments and examples of a zoom lens and an image pickup apparatus using the same will be described below in detail by referring to the accompanying diagrams. However, the present invention is not restricted to the embodiments and the examples described below.

A zoom lens according to the present embodiment is a zoom lens to be used in a video camera and a digital camera, and is a zoom lens having a small size, a wide angle of view, and a high zooming ratio.

An arrangement of the zoom lens according to the present embodiment will be described below. Firstly, a basic arrangement will be described.

In the basic arrangement of the zoom lens according to the present embodiment, the zoom lens includes in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, and at the time of zooming, each of the first lens unit, the second lens unit, the third lens unit, the fourth lens unit, and the fifth lens unit moves to change distances between the lens units.

In the basic arrangement, the lens units having a positive refractive power are disposed nearest to the object side. A zoom lens with such an arrangement is called as a positive-lead type zoom lens. By adopting the arrangement of the positive-lead type in the basic arrangement, an arrangement of lens units which is preferable for a zoom lens having a high zooming ratio is realized.

Moreover, in the basic arrangement, the refractive power of the fourth lens unit is let to be a negative refractive power, and a refractive power of the fifth lens unit is let to be a positive refractive power. Accordingly, after making an off-axis principal ray to be refracted in a direction away from an optical axis in the fourth lens unit, the off-axis principal ray is made to be incident on the fifth lens unit. By doing so, a size (diameter) of each lens unit from the first lens unit to the fourth lens unit is made small. Moreover, by the fifth lens unit having a positive refractive power, a position of an exit pupil is kept away from an image plane.

By arranging the optical system such that a refractive-power arrangement becomes symmetrical as a whole, it contributes to securing a favorable optical performance.

Moreover, by moving each lens unit from the first lens unit to the fifth lens unit at the time of zooming, it contributes to optimization of the optical system, or more specifically, it contributes to securing a high zooming ratio and to shortening the overall length of the zoom lens.

Next, preferable arrangements and preferable conditional expressions will be described below.

In the zoom lens according to the present embodiment, it is preferable that a distance between the first lens unit and the second lens unit at a telephoto end is longer than a distance between the first lens unit and the second lens unit at a wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end.

In such manner, in the zoom lens according to the present embodiment, the main zooming is carried out by changing the distance between the first lens unit and the second lens unit and the distance between the second lens unit and the third lens unit.

Moreover, by moving the third lens unit, a function of increasing magnification in the third lens unit is improved, and also it is possible to make an adjustment such that an entrance pupil at the telephoto end is not too far from a surface of incidence of the first lens unit. In such manner, the movement of the third lens unit contributes to making a diameter of the overall zoom lens small.

The movement of the fourth lens unit and the fifth lens unit contribute to adjusting an image plane position when an increase in the overall length of the zoom lens has been suppressed, and to securing a high zooming ratio.

Moreover, in the zoom lens according to the present embodiment, when there is a camera-shake, it is preferable to correct an image blur on an image plane by moving the third lens unit in a direction orthogonal to an optical axis.

By making the zooming ratio of the zoom lens high, a focal length of the overall zoom lens system at the telephoto end becomes long. Therefore, in photography at the telephoto end in particular, sometimes an image on the image plane is blurred due to the camera-shake. Therefore, when there is a camera-shake, it is preferable to correct the image blur on the image plane.

The third lens unit is a lens unit which is favorable for making a diameter small. Therefore, in the zoom lens according to the present embodiment, the third lens unit is moved for correction of the image blur. Accordingly, image is captured without the image blur even in the photography at the telephoto end.

Moreover, in the zoom lens according to the present embodiment, it if preferable that the first lens unit includes a cemented lens having a negative lens and a positive lens, and at least one positive lens.

By making such an arrangement, it contributes to reduction of a spherical aberration and a chromatic aberration at the telephoto end when the zooming ratio is made high.

Moreover, in the zoom lens according to the present embodiment, it is preferable that the following conditional expressions (1), (2), and (3) are satisfied.

$$2 < mg_{3t}/mg_{3w} < 6 \quad (1)$$

$$1.2 < mg_{5t}/mg_{5w} < 4 \quad (2)$$

$$0.02 < f_5/f_t < 0.12 \quad (3)$$

where, $mg_{3w}$ denotes a lateral magnification of the third lens unit at the wide angle end, $mg_{3t}$ denotes a lateral magnification of the third lens unit at the telephoto end, $mg_{5w}$ denotes a lateral magnification of the fifth lens unit at the wide angle end, $mg_{5t}$ denotes a lateral magnification of the fifth lens unit at the telephoto end, $f_5$ denotes a focal length of the fifth lens unit, and $f_t$ denotes a focal length of the overall zoom lens system at the telephoto end.

By letting the zooming ratio of the third lens unit to be within a range of conditional expression (1), and by letting the zooming ratio of the fifth lens unit to be within a range of conditional expression (2), it contributes to realization of both the small-sizing of the zoom lens and the favorable optical performance.

By making so as not to fall below a lower limit value of conditional expression (1), a rate of contribution of the third lens unit to the zooming is improved, and a load of zooming on the second lens unit is reduced. Accordingly, the negative refractive power of the second lens unit is made small, and a fluctuation in an astigmatism at the time of zooming is suppressed. By making such an arrangement, it contributes to small-sizing of the zoom lens and improvement in the optical performance.

By making so as not to exceed an upper limit value of conditional expression (1), the rate of contribution of the third lens unit to the zooming is suppressed from becoming excessive, and accordingly, the astigmatism which occurs in the third lens unit is reduced.

By making so as not to fall below a lower limit value of conditional expression (2), a rate of contribution of the fifth lens unit to the zooming is improved, and an amount of movement of the fifth lens unit at the time of zooming is made small. By making such an arrangement, it contributes to achieving both of securing a high zooming ratio and small-sizing of the overall zoom lens.

By making so as not to exceed an upper limit value of conditional expression (2), the rate of contribution of the fifth lens unit to the zooming is suppressed from becoming excessive, and accordingly, the astigmatism which occurs in the fifth lens unit is reduced.

By letting the focal length of the fifth lens unit to be within a range of conditional expression (3), it contributes further to achieving both the small-sizing of the zoom lens and a high zooming ratio.

By making so as not to fall below a lower limit value of conditional expression (3), the refractive power of the fifth lens unit is suppressed from becoming excessive, and accordingly, an aberration which occurs in the fifth lens unit is reduced. Moreover, by reducing the aberration which occurs in the fifth lens unit, a fluctuation in the aberration at the time of zooming is reduced.

By making so as not to exceed an upper limit value of conditional expression (3), the refractive power of the fifth lens unit is made large, and accordingly, it contributes to shortening the overall length of the zoom lens. Moreover, by moving the exit pupil away from the image plane so as not to exceed an upper limit value of conditional expression (3), it contributes to a reduction in degradation of a peripheral image when an electronic image pickup element is used. It is possible to improve a variation in an amount of light in a central area of an image and an amount of light in a peripheral area of the image for example.

Moreover, in the zoom lens according to the present embodiment, it is preferable that the following conditional expression (4) is satisfied.

$$0.02 < f_3/f_t < 0.1 \quad (4)$$

where, $f_3$ denotes a focal length of the third lens unit, and $f_t$ denotes a focal length of the overall zoom lens system at the telephoto end.

By making so as not to fall below a lower limit value of conditional expression (4), the refractive power of the third lens unit is suppressed from becoming excessive, thereby reducing the spherical aberration at the telephoto end. Moreover, by making such an arrangement, it is possible reduce an effect of a manufacturing error for the optical performance.

By making so as not to exceed an upper limit value of conditional expression (4), the refractive power of the third lens unit is made large, and accordingly, it contributes to shortening the overall length of the zoom lens at the telephoto end, and to small-sizing. Moreover, by making such an arrangement, even when the third lens unit is let to be a lens unit to be moved for the correction of the camera-shake, it is advantageous for small-sizing and optimizing an amount of movement of the third lens unit.

Moreover, in the zoom lens according to the present embodiment, it is preferable that the following conditional expression (5) is satisfied.

$$1.5 < (1 - mg_{3t}) \times mg_{4t} \times mg_{5t} < 7.0 \quad (5)$$

where, $mg_{3t}$ denotes a lateral magnification of the third lens unit at the telephoto end, $mg_{4t}$ denotes a lateral magnification of the fourth lens unit at the telephoto end, and $mg_{5t}$ denotes a lateral magnification of the fifth lens unit at the telephoto end.

For correcting the image blur, the third lens unit is moved by an actuator etc. in a direction perpendicular to the optical axis. By the lateral magnification of the third lens unit at the telephoto end, the lateral magnification of the fourth lens unit at the telephoto end, and the lateral magnification of the fifth lens unit at the telephoto end satisfying conditional expression (5), the amount of movement of the third lens unit at the time of correcting the image blur is reduced, and accordingly, a mechanism for carrying out correction of the image blur is made small-sized.

By making so as not to fall below a lower limit value of conditional expression (5), the amount of movement of the third lens unit at the time of correcting the image blur is reduced, and accordingly, it contributes to small-sizing of the mechanism for carrying out the correction of the image blur.

By making so as not to exceed an upper limit value of conditional expression (5), an amount of correction of the image blur with respect to the amount of movement of the third lens unit is not let to be excessive. Accordingly, a control of the actuator is made simple.

Moreover, in the zoom lens according to the present embodiment, it is preferable that the first lens unit includes a negative lens which satisfies the following conditional expression (6), and a positive lens which satisfies the following conditional expression (7).

$$vd_{1n} < 50 \quad (6)$$

$$80 < vd_{1p} \quad (7)$$

$vd_{1n}$ denotes Abbe's number for a d-line of at least one negative lens in the first lens unit, $vd_{1p}$ denotes Abbe's number for the d-line of at least one positive lens in the first lens unit, Abbe's number $vd_{1n}$ is indicated by $vd_{1n} = (nd_{1n} - 1)/(nF_{1n} - nC_{1n})$, Abbe's number $vd_{1p}$ is indicated by $vd_{1p} = (nd_{1p} - 1)/(nF_{1p} - nC_{1p})$, $nd_{1n}$, $ng_{1n}$, $nF_{1n}$, and $nC_{1n}$ are refractive indices for the d-line, the g-line, the F-line, and a C-line respectively, of at least one negative lens in the first lens unit, and $nd_{1p}$, $ng_{1p}$, $nF_{1p}$, and $nC_{1p}$ are refractive indices for the d-line, the g-line, the F-line, and the C-line respectively, of at least one positive lens in the first lens unit.

By satisfying conditional expressions (6) and (7), a correction of the chromatic aberration susceptible to occur due to small-sizing and making the zooming ratio of the zoom lens high, is carried out.

By making the zooming ratio of the zoom lens high, the focal length of the overall zoom lens system at the telephoto end becomes long. With the focal length of the overall zoom lens becoming long, a first-order chromatic aberration (longitudinal chromatic aberration or chromatic aberration of magnification) occurring in the first lens unit is susceptible to become large. Therefore, for correction of the first-order chromatic aberration, a material with a high dispersion included in conditional expression (6) is used for at least one negative lens, and a material with a low dispersion included in conditional expression (7) is used for at least one positive lens.

By making so as not to exceed an upper limit value of conditional expression (6), due to the first-order chromatic aberration that occurs in the negative lens, the first-order chromatic aberration of the first lens unit is reduced. Moreover, by making so as not to fall below a lower limit value of conditional expression (7), the occurrence of the first-order chromatic aberration in the positive lens is suppressed.

Moreover, in the zoom lens according to the present embodiment, it is preferable that the negative lens which satisfies conditional expression (6) satisfies the following conditional expression (8).

$$\theta gF_{1n} < -0.00266 vd_{1n} + 0.68107 \quad (8)$$

where, $vd_{1n}$ denotes Abbe's number for a d-line of at least one negative lens in the first lens unit, $\theta gF_{1n}$ denotes a partial dispersion ratio for a g-line and an F-line of at least one negative lens in the first lens unit, Abbe's number $vd_{1n}$ is indicated by $vd_{1n} = (nd_{1n}-1)/(nF_{1n}-nC_{1n})$, the partial dispersion ratio $\theta gF_{1n}$ is indicated by $\theta gF_{1n} = (ng_{1n}-nF_{1n})/(nF_{1n}-nC_{1n})$, and $nd_{1n}$, $ng_{1n}$, $nF_{1n}$, and $nC_{1n}$ are refractive indices for the d-line, the g-line, the F-line, and a C-line respectively, of at least one negative lens in the first lens unit.

For correction of a secondary color spectrum, a material having a partial dispersion ratio stipulated by conditional expression (8) is used for the negative lens which satisfies conditional expression (6).

As the focal length of the overall zoom lens system at the telephoto end becomes long, as aforementioned, the amount of the first-order chromatic aberration which occurs in the first lens unit is susceptible to become large, and furthermore, an amount of the secondary color spectrum (the chromatic aberration remained) which occurs is also susceptible to become large. Therefore, by using a material which satisfies conditional expression (6) and conditional expression (8), or in other words, a material for which, an anomalous dispersibility is large to some extent, for the negative lens, it contributes to correction of the chromatic aberration or to correction of the secondary color spectrum in particular. By letting an arrangement to be such arrangement, reduction of the chromatic aberration is facilitated even if the refractive power of the first lens unit is made large. Accordingly, it contributes to achieving both of small-sizing and making the zooming ratio of the optical system high.

Moreover, in the zoom lens according to the present embodiment, it is preferable that the following conditional expression (9) is satisfied.

$$-0.15 < f_1/f_{1c} < 0.15 \quad (9)$$

where, $f_1$ denotes a focal length of the first lens unit, and
$f_{1c}$ denotes a focal length of the cemented lens in the first lens unit.

By making so as not to fall below a lower limit value of conditional expression (9), the negative refractive power of the cemented lens in the first lens unit is not let to be large. Or, by making so as not to exceed an upper limit value of conditional expression (9), the positive refractive power of the cemented lens is not let to be large. Making such an arrangement contributes to reducing the spherical aberration of the first lens unit and improvement in an image forming performance at the telephoto end.

The basic arrangement, the preferable arrangements, and preferable conditional expressions have heretofore been described. However, by combining a preferable arrangement and a preferable conditional expression with the basic arrangement, it is possible to form the zoom lens of the present embodiment more specifically. The more specific zoom lens of the present embodiment is as follows. Since a technical significance of each arrangement and a technical significance of each conditional expression have already been explained, the explanation thereof will be omitted in the following description.

In a zoom lens according to a first embodiment, in addition to the abovementioned arrangement, a distance between the first lens unit and the second lens unit at a telephoto end is longer than a distance between the first lens unit and the second lens unit at a wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end, and the following conditional expressions (1), (2), and (3) are satisfied.

$$2 < mg_{3t}/mg_{3w} < 6 \quad (1)$$

$$1.2 < mg_{5t}/mg_{5w} < 4 \quad (2)$$

$$0.02 < f_5/f_t < 0.12 \quad (3)$$

where, $mg_{3w}$ denotes a lateral magnification of the third lens unit at the wide angle end, $mg_{3t}$ denotes a lateral magnification of the third lens unit at the telephoto end, $mg_{5w}$ denotes a lateral magnification of the fifth lens unit at the wide angle end, $mg_{5t}$ denotes a lateral magnification of the fifth lens unit at the telephoto end, $f_5$ denotes a focal length of the fifth lens unit, and
$f_t$ denotes a focal length of the overall zoom lens system at the telephoto end.

According to the zoom lens of the first embodiment, it is possible to provide a zoom lens in which, various aberrations are corrected favorably, and which is advantageous for securing a high zooming ratio and for small-sizing of the optical system.

In a zoom lens according to a second embodiment, in addition to the abovementioned arrangement, when there is a camera-shake, an image blur on an image plane is corrected by moving the third lens unit in a direction orthogonal to an optical axis, and the following conditional expressions (4) and (5) are satisfied.

$$0.02 < f_3/f_t < 0.1 \quad (4)$$

$$1.5 < (1-mg_{3t}) \times mg_{4t} \times mg_{5t} < 7.0 \quad (5)$$

where, $f_3$ denotes a focal length of the third lens unit, $f_t$ denotes a focal length of the overall zoom lens system at a telephoto end, $mg_{3t}$ denotes a lateral magnification of the third lens unit at the telephoto end, $mg_{4t}$ denotes a lateral magnification of the fourth lens unit at the telephoto end, and $mg_{5t}$ denotes a lateral magnification of the fifth lens unit at the telephoto end.

According to the zoom lens of the second embodiment, it is possible to provide a zoom lens in which, various aberrations are corrected favorably, and which is advantageous for securing a high zooming ratio and for small-sizing of the optical system, and in which, it is easy to suppress an effect of the camera-shake which is susceptible to occur at the telephoto side.

Here, in the zoom lens according to the second embodiment, it is preferable that a distance between the first lens unit and the second lens unit at the telephoto end is longer than a distance between the first lens unit and the second lens unit at the wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end.

In a zoom lens according to a third embodiment, in addition to the abovementioned basic arrangement, a distance between the first lens unit and the second lens unit at a telephoto end is longer than a distance between the first lens unit and the second lens unit at a wide angle end, a distance between the third lens unit and the fourth lens unit at the telephoto end is longer than a distance between the third lens unit and the fourth lens unit at the wide angle end, a distance between the fourth lens unit and the fifth lens unit at the telephoto end is longer than a distance between the fourth lens unit and the fifth lens unit at the wide angle end, and a distance between the second lens unit and the third lens unit at the telephoto end is shorter than a distance between the second lens unit and the third lens unit at the wide angle end, and the first lens unit includes a negative lens which satisfies the following conditional expressions (6) and (8), and a positive lens which satisfies the following conditional expression (7), and the first lens unit includes a cemented lens having a negative lens and a positive lens, and at least one positive lens, and the following conditional expression (9) is satisfied.

$$vd_{1n}<50 \quad (6)$$

$$80<vd_{1p} \quad (7)$$

$$\theta gF_{1n}<-0.00266vd_{1n}+0.68107 \quad (8)$$

$$-0.15<f_1/f_{1c}<0.15 \quad (9)$$

where, $vd_{1n}$ denotes Abbe's number for a d-line of at least one negative lens in the first lens unit, $vd_{1p}$ denotes Abbe's number for the d-line of at least one positive lens in the first lens unit, $\theta gF_{1n}$ denotes a partial dispersion ratio for a g-line and an F-line of at least one negative lens in the first lens unit, $f_1$ denotes a focal length of the first lens unit, $f_{1c}$ denotes a focal length of the cemented lens in the first lens unit, Abbe's number $vd_{1n}$ is indicated by $vd_{1n}=(nd_{1n}-1)/(nF_{1n}-nC_{1n})$, Abbe's number $vd_{1p}$ is indicated by $vd_{1p}=(nd_{1p}-1)/(nF_{1p}-nC_{1p})$, the partial dispersion ratio $\theta gF_{1n}$ is indicated by $\theta gF_{1n}=(ng_{1n}-nF_{1n})/(nF_{1n}-nC_{1n})$, $nd_{1n}$, $ng_{1n}$, $nF_{1n}$, and $nC_{1n}$ are refractive indices for the d-line, the g-line, the F-line, and a C-line respectively, of at least one negative lens in the first lens unit, and $nd_{1p}$, $ng_{1p}$, $nF_{1p}$, and $nC_{1p}$ are refractive indices for the d-line, the g-line, the F-line, and the C-line of at least one positive lens in the first lens unit.

According to the zoom lens of the third embodiment, it is possible to provide a zoom lens which is advantageous for securing a high zooming ratio and for small-sizing of the optical system, and in which, it is possible to suppress the occurrence of the chromatic aberration which is susceptible to occur at the telephoto end.

In the zoom lenses according to embodiments from the first embodiment to the third embodiment (hereinafter, appropriately called as 'the zoom lens of the present embodiment'), it is possible to combine the following arrangements and conditional expressions.

In the zoom lens of the present embodiment, it is preferable that the following conditional expression (4) is satisfied.

$$0.02<f_3/f_t<0.1 \quad (4)$$

where, $f_3$ denotes a focal length of the third lens unit, and $f_t$ denotes the focal length of the overall zoom lens system at the telephoto end.

A technical significance of conditional expression (4) is as already been explained.

Moreover, in the zoom lens of the present embodiment, it is preferable that when there is a camera-shake, an image blur on an image plane is corrected by moving the third lens unit in a direction orthogonal to an optical axis.

A technical significance of such arrangement is as already been explained.

Moreover, in the zoom lens of the present embodiment, it is preferable that the following conditional expression (5) is satisfied.

$$1.5<(1-mg_{3t})\times mg_{4t}\times mg_{5t}<7.0 \quad (5)$$

where, $mg_{3t}$ denotes a lateral magnification of the third lens unit at the telephoto end, $mg_{4t}$ denotes a lateral magnification of the fourth lens unit at the telephoto end, and $mg_{5t}$ denotes a lateral magnification of the fifth lens unit at the telephoto end.

A technical significance of conditional expression (5) is as already been explained.

Moreover, in the zoom lens according to the present embodiment, it is preferable that the first lens unit includes a negative lens which satisfies the following conditional expression (6), and a positive lens which satisfies the following conditional expression (7).

$$vd_{1n}<50 \quad (6)$$

$$80<vd_{1p} \quad (7)$$

where, $vd_{1n}$ denotes Abbe's number for a d-line of at least one negative lens in the first lens unit, $vd_{1p}$ denotes Abbe's number for the d-line of at least one positive lens in the first lens unit, Abbe's number $vd_{1n}$ is indicated by $vd_{1n}=(nd_{1n}-1)/(nF_{1n}-nC_{1n})$, Abbe's number $vd_{1p}$ is indicated by $vd_{1p}=(nd_{1p}-1)/(nF_{1p}-nC_{1p})$, $nd_{1n}$, $ng_{1n}$, $nF_{1n}$, and $nC_{1n}$ are refractive indices for the d-line, the g-line, the F-line, and a C-line respectively, of at least one negative lens in the first lens unit, and $nd_{1p}$, $ng_{1p}$, $nF_{1p}$, and $nC_{1p}$ are refractive indices for the d-line, the g-line, the F-line, and the C-line of at least one positive lens in the first lens unit.

A technical significance of conditional expressions (6) and (7) is as already been explained.

Moreover, in the zoom lens according to the present embodiment, it is preferable that the negative lens which satisfies conditional expression (6) satisfies the following conditional expression (8).

$$\theta gF_{1n} < -0.00266 vd_{1n} + 0.68107 \qquad (8)$$

where, $vd_{1n}$ denotes Abbe's number for a d-line of at least one negative lens in the first lens unit, $\theta gF_{1n}$ denotes a partial dispersion ratio for a g-line and an F-line of at least one negative lens in the first lens unit, Abbe's number $vd_{1n}$ is indicated by $vf_{1n}=(nd_{1n}-1)/(nF_{1n}-nC_{1n})$, the partial dispersion ratio $\theta gF_{1n}$ is indicated by $\theta gF_{1n}=(ng_{1n}-nF_{1n})/(nF_{1n}-nC_{1n})$, and $nd_{1n}$, $ng_{1n}$, $nF_{1n}$, and $nC_{1n}$ are refractive indices for the d-line, the g-line, the F-line, and a C-line, of at least one negative lens in the first lens unit.

A technical significance of conditional expression (8) is as already been explained.

Moreover, in the zoom lens according to the present embodiment, it is preferable that the first lens unit includes a cemented lens having a negative lens and a positive lens, and at least one positive lens.

A technical significance of such arrangement is as already been explained.

Moreover, in the zoom lens according to the present embodiment, it is preferable that the following conditional expression (9) is satisfied.

$$-0.15 < f_1/f_{1c} < 0.15 \qquad (9)$$

where, $f_1$ denotes the focal length of the first lens unit, and $f_{1c}$ denotes a focal length of the cemented lens in the first lens unit.

A technical significance of conditional expression (9) is as already been explained.

Moreover, in the zoom lens according to the present embodiment, it is preferable that the first lens unit and the third lens unit are positioned more on the object side at the telephoto end than at the wide angle end, and the fifth lens unit is positioned more on the image side at the telephoto end than at the wide angle end.

As it has been mentioned above, in the zoom lens according to the present embodiment, the main zooming is carried out by movement of the first lens unit, the second lens unit, and the third lens unit. Furthermore, at the wide angle end, the combined refractive power of the first lens unit and the second lens unit is let to be a negative refractive power, and the combined refractive power of the third lens unit and lens units disposed on the image side of the third lens unit is let to be positive refractive power. In other words, at the wide angle end, the type of the optical system is let to be a retro focus type. Moreover, the zooming effect is imparted by widening the distance between the second lens unit and the third lens unit at the wide angle end, and narrowing the distance between the second lens unit and the third lens unit at the telephoto end.

Moreover, by the third lens unit being positioned more on the object side at the telephoto end than at the wide angle end, the zooming ratio of the third lens unit is improved.

Furthermore, for realizing a high zooming ratio, a distance between the third lens unit and the fifth lens unit is increased at the telephoto end with respect to the wide angle end. At this time, by the fifth lens unit being positioned on the image side at the telephoto end with respect to the wide angle end, the magnification is increased even in the fifth lens unit, and accordingly, it contributes to a high zooming ratio.

Moreover, in the zoom lens according to the present embodiment, it is preferable that the second lens unit is positioned more on the image side at the telephoto end than at the wide angle end.

By the first lens unit moving more to the object side at the telephoto end than at the wide angle end, and the second lens unit moving more to the image side at the telephoto end than at the wide angle end, a large zooming effect is imparted. Accordingly, it becomes easy to reduce an amount of movement of the first lens unit, and making a lens-barrel structure small is also made easy.

Moreover, in the zoom lens according to the present embodiment, it is preferable that the following conditional expression (10) is satisfied.

$$0.2 < f_1/f_t < 0.5 \qquad (10)$$

where, $f_1$ denotes a focal length of the first lens unit, and $f_t$ denotes a focal length of the overall zoom lens system at the telephoto end.

By making so as not to fall below a lower limit value of conditional expression (10), the refractive power of the first lens unit is suppressed from becoming excessive, and it contributes to reduction of the spherical aberration at the telephoto end. By securing an appropriate refractive power of the first lens unit so as not to exceed an upper limit value of conditional expression (10), it contributes to shortening the overall length of the zoom lens at the telephoto end, and to making the lens diameter small.

Moreover, in the zoom lens according to the present embodiment, it is preferable that, at the time of focusing from an infinite object point to a near object point, the fourth lens unit moves toward the image side.

For reducing a load on a drive mechanism such as an actuator, which drives a lens unit, it is preferable to let the focusing lens unit to be a lens unit having a small lens diameter and light weight. In the zoom lens according to the present embodiment, a lens unit on the image side of the third lens unit is such lens unit. Whereas, since the lateral magnification of the fifth lens unit is smaller than 1, if the fifth lens unit is used for focusing, the amount of movement becomes large. In this case, since the fluctuation in the chromatic aberration at the telephoto end in particular becomes large, it becomes difficult to maintain the optical performance at the time of focusing to an object point at a close distance.

Therefore, the fourth lens unit for which, the lateral magnification is more than 1, is let to be the focusing unit. By doing so, the amount of movement at the time of focusing is made small, and the aberration fluctuation is made small.

Moreover, in the zoom lens according to the present embodiment, it is preferable that, at the wide angle end, a light ray of a half angle of view 30° or more is capable of passing through the zoom lens, and the following conditional expression (11) is satisfied.

$$40 < f_t/f_w < 150 \quad (11)$$

where, $f_t$ denotes the focal length of the overall zoom lens system at the telephoto end, and $f_w$ denotes a focal length of the overall zoom lens system at a wide angle end.

By securing the zooming ratio so as not to fall below a lower limit value of conditional expression (11), it is possible to select a photographing angle of view suitable for each of various photographing scenes (scenes to be captured or objects to be captured). By suppressing an increase in the zooming ratio so as not to exceed an upper limit value of conditional expression (11), a brightness, which is necessary at the telephoto end, is secured.

As mentioned above, each lens unit moves at the time of zooming. To put it more specifically, it is preferable that each lens unit moves as described below, at the time of zooming from the wide angle end to the telephoto end. The first lens unit moves only toward the object side. The second lens unit moves only toward the image side. The third lens unit moves only to the object side. The fourth lens unit, during an interval from the wide angle end to an intermediate focal length state, either moves toward the image side, after moving toward the object side, or moves only toward the object side. Moreover, during an interval from the intermediate focal length state to the telephoto end, the fourth lens unit either moves only toward the image side, or after moving toward the image side, moves toward the object side. The fifth lens unit, during an interval from the wide angle end to the intermediate focal length state, moves only toward the image side. Moreover, the fifth lens unit, during an interval from the intermediate focal length state to the telephoto end, either moves only toward the image side, or after moving toward the image side, moves toward the object side.

Moreover, an image pickup apparatus according to the present embodiment includes a zoom lens, and an image pickup element which has an image pickup surface, and which converts an image formed on the image pickup surface by the zoom lens, to an electric image, and the zoom lens is the abovementioned zoom lens.

By making such an arrangement, it is possible to provide an image pickup apparatus which, while having a small size and a high zooming ratio, has the following features. (I) An image pickup apparatus which is capable of acquiring an image in which, various aberrations are corrected favorably. (II) An image pickup apparatus which is capable of acquiring an image in which, various aberrations are corrected favorably, and also an effect of camera-shake is suppressed. (III) An image pickup apparatus which is capable of acquiring an image with less chromatic aberration.

Moreover, in the image pickup apparatus according to the present embodiment, it is preferable that the image pickup apparatus includes an image converting section, and an electric signal having a distortion due to the zoom lens, is converted to an image signal in which, the distortion is corrected by an image processing in the image converting section.

By making such an arrangement, the zoom lens to be used in the image pickup apparatus becomes a zoom lens in which, the astigmatism has been corrected more favorably, instead of allowing a barrel-shaped distortion at the wide angle side. In other words, in the zoom lens to be used in the image pickup apparatus, various aberrations and specifications are optimized in the overall optical system. Moreover, by carrying out the correction of distortion electrically, it contributes to achieving both of small-sizing and well-maintained image quality.

An amount of correction of distortion may be changed for each color signal, and also the chromatic aberration of magnification may be corrected by image processing.

In a case in which, the zoom lens has a focusing function, the abovementioned arrangements will be let to be arrangements in a state of being focused at an infinite object point. Moreover, both the focal length of the overall zoom lens system and the lateral magnification of each lens unit in the abovementioned conditional expressions are let to be the focal length and the lateral magnification in a state of being focused at an infinite object point.

It is preferable that a plurality of the abovementioned arrangements is simultaneously satisfied interactively. Moreover, an arrangement may be made such that some of the arrangements are satisfied simultaneously. For instance, an arrangement may be made such that one of the abovementioned zoom lenses is used in one of the aforementioned zoom lenses or the image pickup apparatus.

Moreover, regarding the conditional expressions, an arrangement may be made such that each conditional expression is satisfied separately. When such an arrangement is made, it becomes easy to achieve the respective effect, and therefore it is preferable.

For each conditional expression, the lower limit value or the upper limit value may be changed as shown below. When the values are changed as shown below, the effect of each conditional expression is all the more assured, and therefore it is preferable.

For conditional expression (1), it is more preferable to let the lower limit value to be 2.2, and 2.3 is even more preferable.

Moreover, for conditional expression (1), it is more preferable to let the upper limit value to be 4. The upper limit value 3 is even more preferable, and 2.8 is all the more preferable.

For conditional expression (2), it is more preferable to let the lower limit value to be 1.3, and 1.35 is even more preferable.

Moreover, for conditional expression (2), it is more preferable to let the upper limit value to be 3. The upper limit value 2 is even more preferable, and 1.9 is all the more preferable.

For conditional expression (3), it is more preferable to let the lower limit value to be 0.03, and 0.04 is even more preferable.

Moreover, for conditional expression (3), it is more preferable to let the upper limit value to be 0.10, and 0.08 is even more preferable.

For conditional expression (4), it is more preferable to let the lower limit value to be 0.03, and 0.05 is even more preferable.

Moreover, for conditional expression (4), it is more preferable to let the upper limit value to be 0.08, and 0.07 is even more preferable.

For conditional expression (5), it is more preferable to let the lower limit value to be 2.5, and 3.0 is even more preferable.

Moreover, for conditional expression (5), it is more preferable to let the upper limit value to be 5.0, and 4.0 is even more preferable.

For conditional expression (6), it is more preferable to let the upper limit value to be 45, and 43 is even more preferable.

For conditional expression (7), it is more preferable to let the lower limit value to be 81, and 81.5 is even more preferable.

For conditional expression (9), it is more preferable to let the lower limit value to be 0, and 0.05 is even more preferable.

Moreover, for conditional expression (9), it is more preferable to let the upper limit value to be 0.135, and 0.125 is even more preferable.

For conditional expression (10), it is more preferable to let the lower limit value to be 0.25, and 0.32 is even more preferable.

Moreover, for conditional expression (10), it is more preferable to let the upper limit value to be 0.42, and 0.37 is even more preferable.

For conditional expression (11), it is more preferable to let the lower limit value to be 45, and 52 is even more preferable.

Moreover, for conditional expression (11), it is more preferable to let the upper limit value to be 100, and 70 is even more preferable.

Examples of the zoom lens used in the image pickup apparatus according to the present invention will be described below in detail by referring to the accompanying diagrams. However, the present invention is not restricted to the examples described below.

In each example, recording and display of an image after the barrel-shaped distortion occurred at the wide angle side is corrected electrically, are carried out. In the zoom lens of the present example, an image is formed on an opto-electric conversion surface having a rectangular shape. Here, at the wide angle end, the barrel-shaped distortion occurs. Whereas, near the intermediate focal length state or at the telephoto end, the occurrence of the distortion is suppressed.

For correcting the distortion electrically, an effective image pickup area has been set such that the distortion becomes barrel-shaped at the wide angle end and rectangular-shaped in the intermediate focal length state and at the telephoto end. Moreover, image information in the effective image pickup area that has been set in advance is subjected to image conversion, and is converted to rectangular-shaped image information in which, the distortion has been reduced.

In the zoom lens according to the present example, an arrangement is made such that, the maximum image height IHw at the wide angle end becomes smaller than the maximum image height IHt at the telephoto end, and the maximum image heights IHs1, IHs2, and IHs3 in the intermediate focal length states 1, 2, and 3 respectively.

Moreover, in the zoom lens according to the present example, an adhesive is used for sticking the plurality of lenses. In numerical examples, a thickness of a layer of the adhesive is also stipulated. However, an adhesive layer is not a lens.

Examples from an example 1 to an example 6 of the zoom lens will be described below. Lens cross-sectional views of the examples from the example 1 to the example 6 are shown in diagrams from FIG. 1A, FIG. 1B, and FIG. 1C to FIG. 6A, FIG. 6B, and FIG. 6C. In these diagrams, FIG. 1A, FIG. 2A, FIG. 3A, FIG. 4A, FIG. 5A, and FIG. 6A are cross-sectional views at a wide angle end, FIG. 1B, FIG. 2B, FIG. 3B, FIG. 4B, FIG. 5B, and FIG. 6B are cross-sectional views in an intermediate focal length state, and FIG. 1C, FIG. 2C, FIG. 3C, FIG. 4C, FIG. 5C, and FIG. 6C are cross-sectional views at a telephoto end. Each of FIG. 1A, FIG. 1B, and FIG. 1C to FIG. 6A, FIG. 6B, and FIG. 6C is a lens cross-sectional view when focused at an infinite object point.

A first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. A flat and parallel plate F which forms a low-pass filter and a cover glass C of an electronic image pickup element is disposed between the fifth lens unit G5 and the image plane I. A wavelength region restricting coating which restricts infrared light may be applied to a surface of the flat and parallel plate. Moreover, a multilayer film for restricting wavelength region may be applied to a surface of the cover glass. The cover glass C may be imparted an effect of a low-pass filter.

Figure 1B:
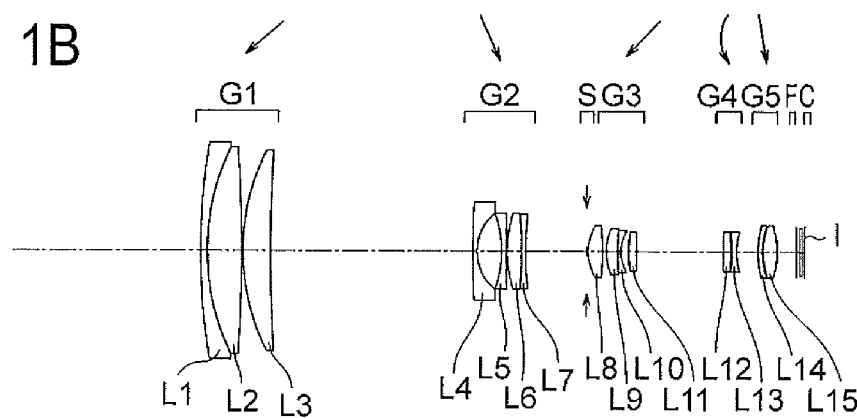
Figure 1C:
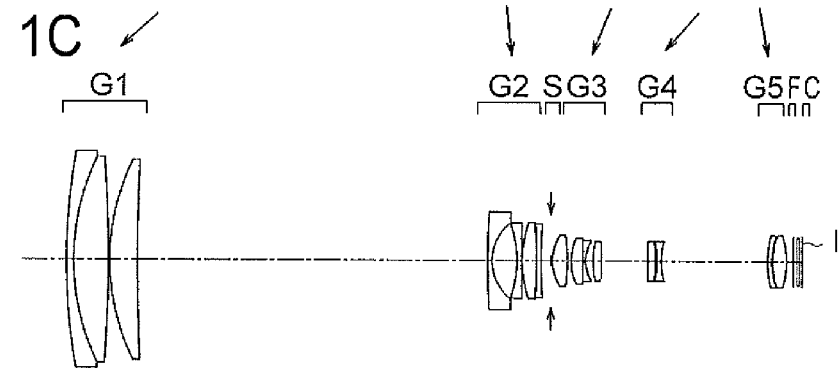

A zoom lens according to the example 1, as shown in FIG. 1A, FIG. 1B, and FIG. 1C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a biconcave negative lens L7. Here, the biconvex positive lens L6 and the biconcave negative lens L7 are cemented.

The third lens unit G3 includes a biconvex positive lens L8, a positive meniscus lens L9 having a convex surface directed toward the object side, a negative meniscus lens L10 having a convex surface directed toward the object side, and a biconvex positive lens L11. Here, the positive meniscus lens L9 and the negative meniscus lens L10 are cemented.

The fourth lens unit G4 includes a biconvex positive lens L12 and a biconcave negative lens L13.

The fifth lens unit G5 includes a negative meniscus lens L14 having a convex surface directed toward the object side and a biconvex positive lens L15.

At the time of zooming from a wide angle end to a telephoto end, each lens unit moves as follows. The first lens unit G1 moves toward the object side. The second lens unit G2 moves toward an image side. The third lens unit G3 moves toward the object side. The fourth lens unit G4, during an interval from the wide angle end to an intermediate focal length state 2, after moving toward the object side, moves toward the image side and, during an interval from the intermediate focal length state 2 to the telephoto end, moves toward the object side. The fifth lens unit G5 moves toward the image side. The aperture stop (stop) S moves toward the object side together with the third lens unit G3.

At the time of correction of image blur, the third lens unit G3 moves in a direction orthogonal to an optical axis. Moreover, at the time of focusing, the fourth lens unit G4 moves along the optical axis.

An aspheric surface is provided to a total of six surfaces namely, both surfaces of the biconcave negative lens L5, both surfaces of the biconvex positive lens L8, an image-side surface of the biconcave negative lens L13, and an image-side surface of the biconvex positive lens L15.

Figure 2A:
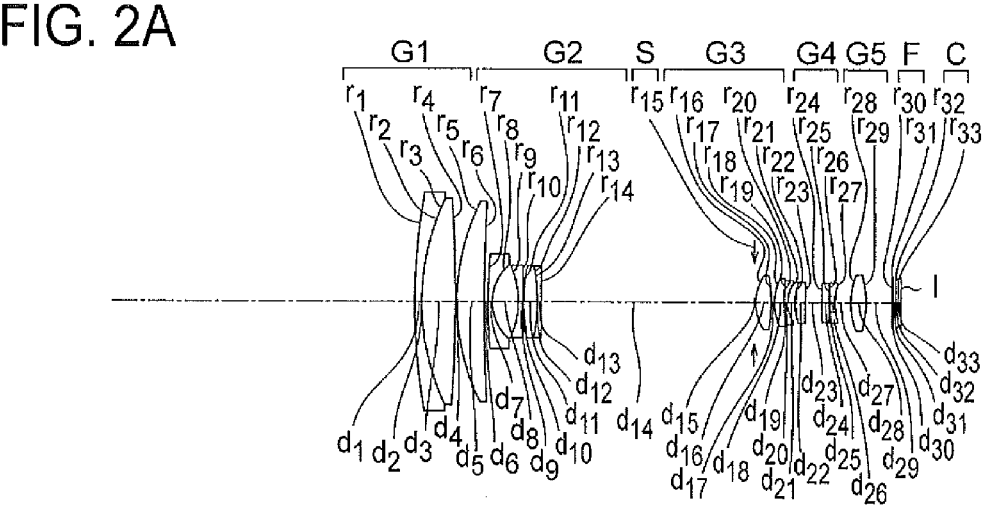
FIG. 2A, FIG. 2B, and FIG. 2C are lens cross-sectional views at the time of infinite object point focusing of a zoom lens according to an example 2, where.
Figure 2B:
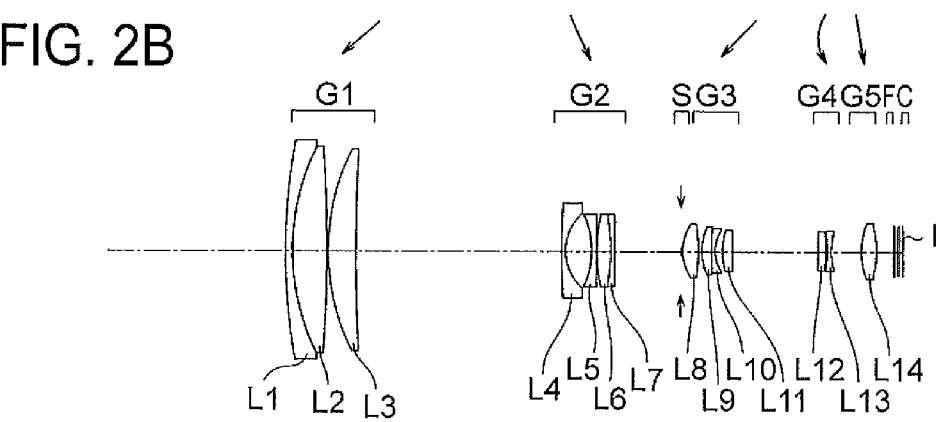
Figure 2C:
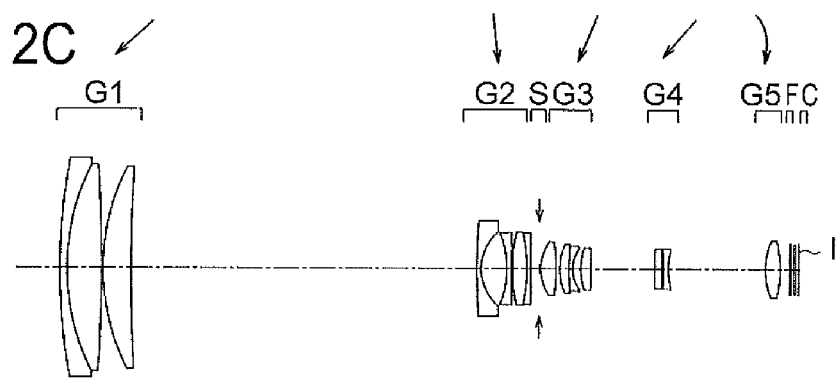

A zoom lens according to the example 2, as shown in FIG. 2A, FIG. 2B, and FIG. 2C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a planoconcave negative lens L7. Here, the biconvex positive lens L6 and the planoconcave negative lens L7 are cemented.

The third lens unit G3 includes a biconvex positive lens L8, a positive meniscus lens L9 having a convex surface directed toward the object side, a negative meniscus lens L10 having a convex surface directed toward the object side, and a biconvex positive lens L11. Here, the positive meniscus lens L9 and the negative meniscus lens L10 are cemented.

The fourth lens unit G4 includes a planoconvex positive lens L12 and a biconcave negative lens L13.

The fifth lens unit G5 includes a biconvex positive lens L14.

At the time of zooming from a wide angle end to a telephoto end, each lens unit moves as follows. The first lens unit G1 moves toward the object side. The second lens unit G2 moves toward an image side. The third lens unit G3 moves toward the object side. The fourth lens unit G4, during an interval from the wide angle end to an intermediate focal length state 2, after moving toward the object side, moves toward the image side and, during an interval from the intermediate focal length 2 to the telephoto end, moves toward the object side. The fifth lens unit G5, during the interval from the wide angle end to the intermediate focal length state 2, moves toward the image side and, during the interval from the intermediate focal length state 2 to the telephoto end, after moving toward the image side, moves toward the object side. The aperture stop (stop) S moves toward the object side together with the third lens unit G3.

At the time of correction of image blur, the third lens unit G3 moves in a direction orthogonal to an optical axis. Moreover, at the time of focusing, the fourth lens unit G4 moves along the optical axis.

An aspheric surface is provided to a total of six surfaces namely, both surfaces of the biconcave negative lens L5, both surfaces of the biconvex positive lens L8, and both surfaces of the biconvex positive lens L14.

Figure 3A:
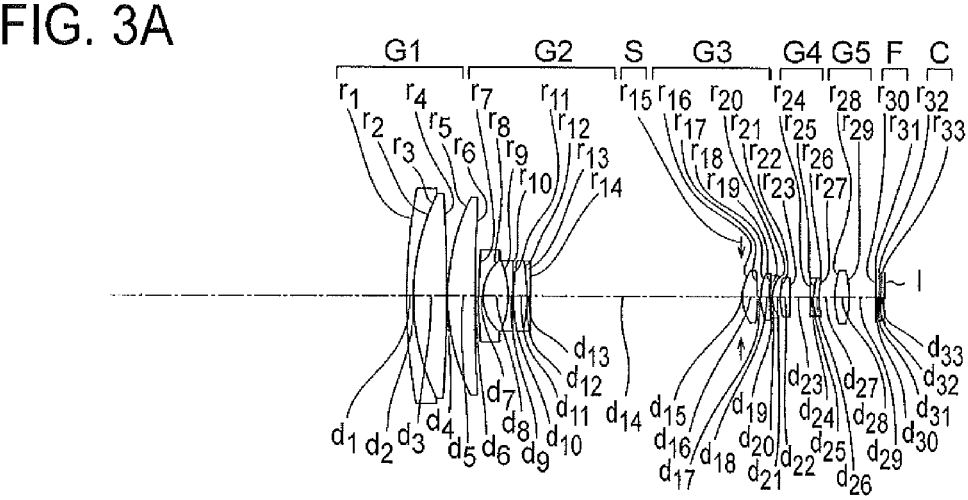
FIG. 3A, FIG. 3B, and FIG. 3C are lens cross-sectional views at the time of infinite object point focusing of a zoom lens according to an example 3, where.
Figure 3B:
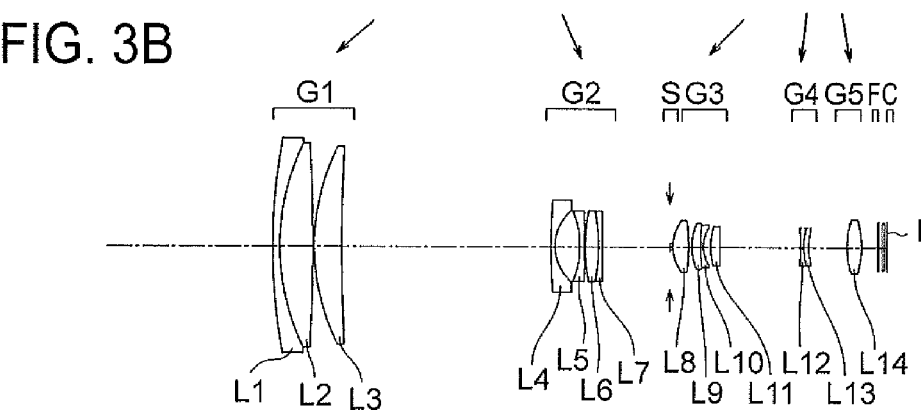
Figure 3C:
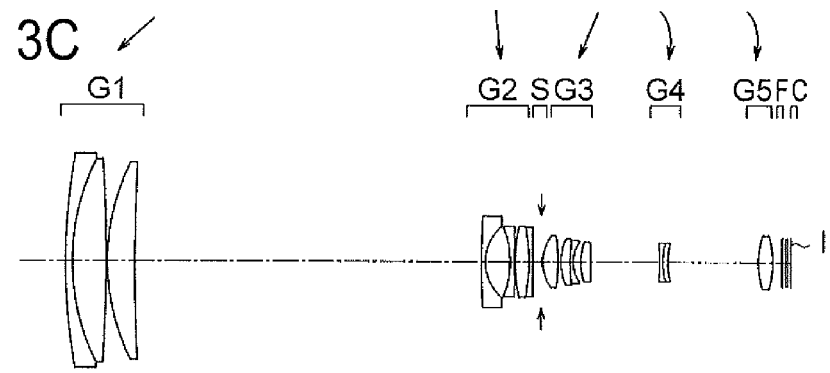

A zoom lens according to the example 3, as shown in FIG. 3A, FIG. 3B, and FIG. 3C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a planoconcave negative lens L7. Here, the biconvex positive lens L6 and the planoconcave negative lens L7 are cemented.

The third lens unit G3 includes a biconvex positive lens L8, a positive meniscus lens L9 having a convex surface directed toward the object side, a negative meniscus lens L10 having a convex surface directed toward the object side, and a biconvex positive lens L11. Here, the positive meniscus lens L9 and the negative meniscus lens L10 are cemented.

The fourth lens unit G4 includes a biconcave negative lens L12 and a positive meniscus lens L13 having a convex surface directed toward the object side. Here, the biconcave negative lens L12 and the positive meniscus lens L13 are cemented.

The fifth lens unit G5 includes a biconvex positive lens L14.

At the time of zooming from a wide angle end to a telephoto end, each lens unit moves as follows. The first lens unit G1 moves toward the object side. The second lens unit G2 moves toward an image side. The third lens unit G3 moves toward the object side. The fourth lens unit G4, during an interval from the wide angle end to an intermediate focal length state 2, moves toward the object side, and during an interval from the intermediate focal length state 2 to the telephoto end, after moving toward the image side, moves toward the object side. The fifth lens unit G5, during the interval from the wide angle end to the intermediate focal length state 2, moves toward the image side and, during the interval from the intermediate focal length state 2 to the telephoto end, after moving toward the image side, moves toward the object side. The aperture stop (stop) S moves toward the object side together with the third lens unit G3.

At the time of correction of image blur, the third lens unit G3 moves in a direction orthogonal to an optical axis. Moreover, at the time of focusing, the fourth lens unit G4 moves along the optical axis.

An aspheric surface is provided to a total of six surfaces namely, both surfaces of the biconcave negative lens L5, both surfaces of the biconvex positive lens L8, and both surfaces of the biconvex positive lens L14.

Figure 4A:
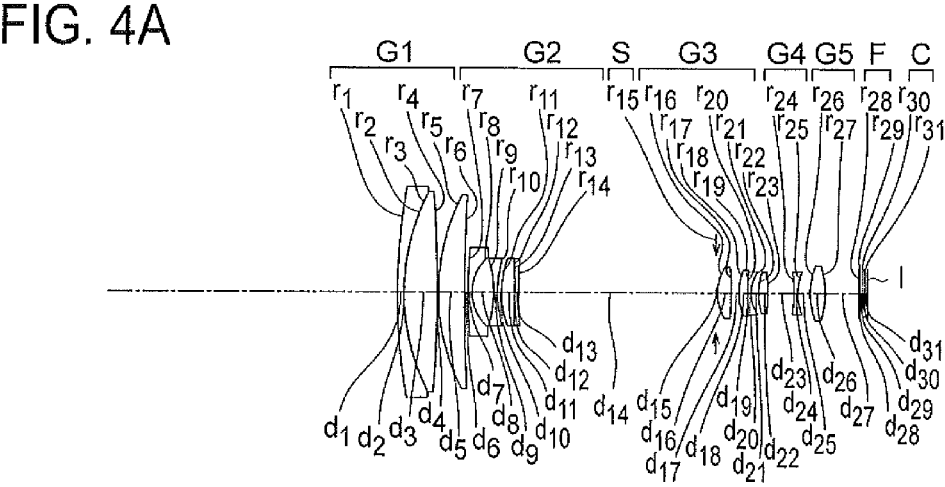
FIG. 4A, FIG. 4B, and FIG. 4C are lens cross-sectional views at the time of infinite object point focusing of a zoom lens according to an example 4, where.
Figure 4B:
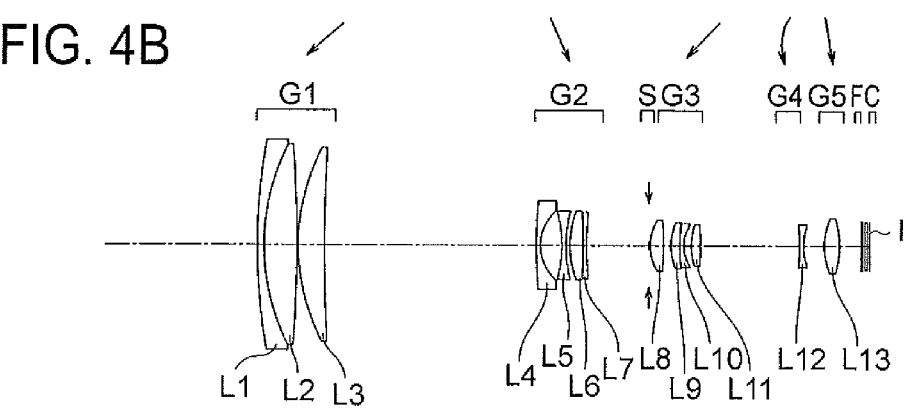
Figure 4C:
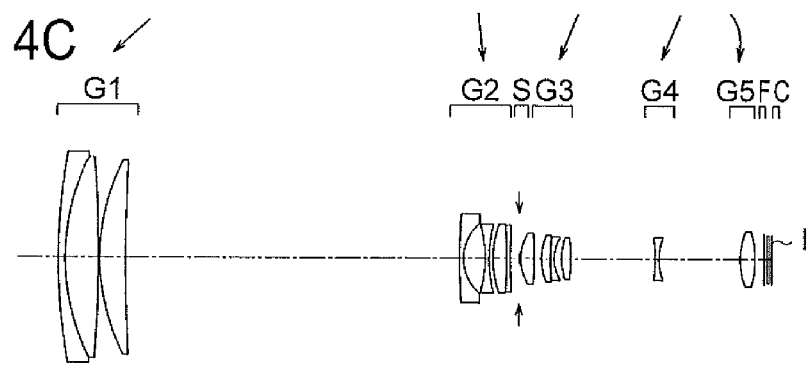

A zoom lens according to the example 4, as shown in FIG. 4A, FIG. 4B, and FIG. 4C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a biconcave negative lens L7. Here, the biconvex positive lens L6 and the biconcave negative lens L7 are cemented.

The third lens unit G3 includes a biconvex positive lens L8, a positive meniscus lens L9 having a convex surface directed toward the object side, a negative meniscus lens L10 having a convex surface directed toward the object side, and a biconvex positive lens L11. Here, the positive meniscus lens L9 and the negative meniscus lens L10 are cemented.

The fourth lens unit G4 includes a biconcave negative lens L12.

The fifth lens unit G5 includes a biconvex positive lens L13.

At the time of zooming from a wide angle end to a telephoto end, each lens unit moves as follows. The first lens unit G1 moves toward the object side. The second lens unit G2 moves toward an image side. The third lens unit G3 moves toward the object side. The fourth lens unit G4, during an interval from the wide angle end to an intermediate focal length state 2, after moving toward the object side, moves toward the image side and, during an interval from the intermediate focal length state 2 to the telephoto end, moves toward the object side. The fifth lens unit G5, during the interval from the wide angle end to the intermediate focal length state 2, moves toward the image side and, during the interval from the intermediate focal length state 2 to the telephoto end, after moving toward the image side, moves toward the object side. The aperture stop (stop) S moves toward the object side together with the third lens unit G3.

At the time of correction of image blur, the third lens unit G3 moves in a direction orthogonal to an optical axis. Moreover, at the time of focusing, the fourth lens unit G4 moves along the optical axis.

An aspheric surface is provided to a total of five surfaces namely, an image-side surface of the biconcave negative lens L5, both surfaces of the biconvex positive lens L8, and both surfaces of the biconvex positive lens L13.

Figure 5A:
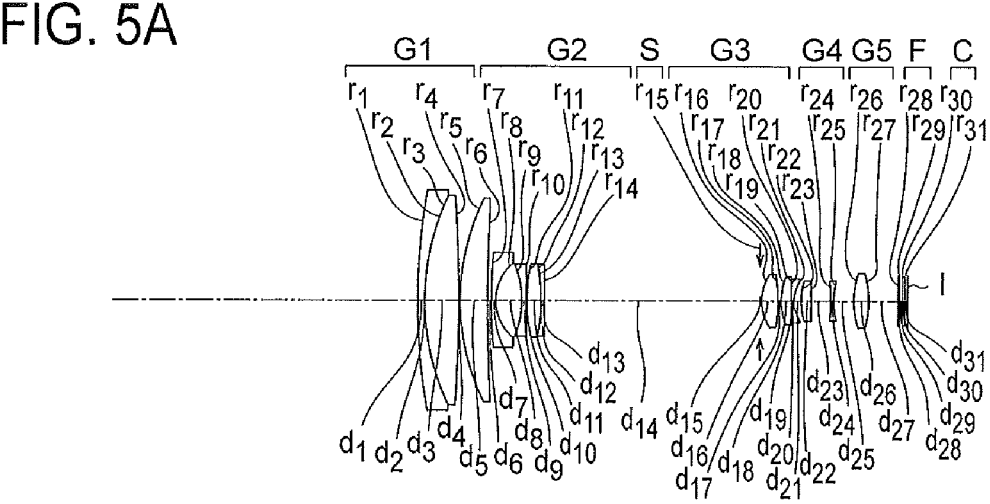
FIG. 5A, FIG. 5B, and FIG. 5C are lens cross-sectional views at the time of infinite object point focusing of a zoom lens according to an example 5, where.
Figure 5B:
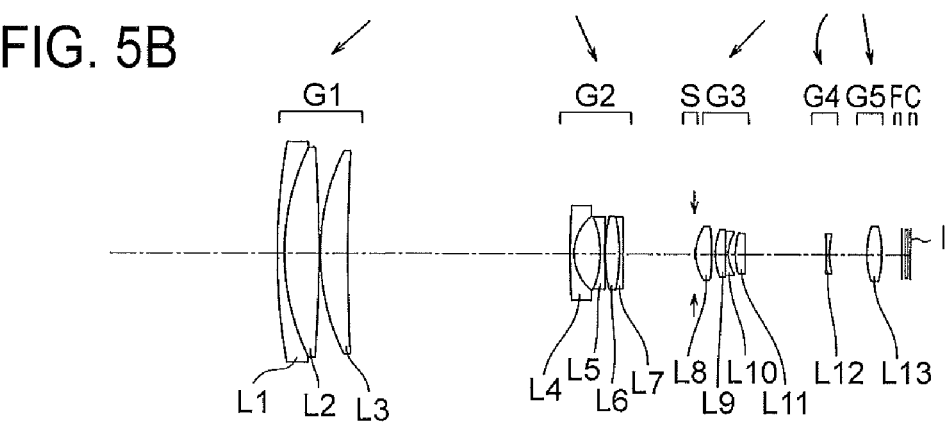
Figure 5C:
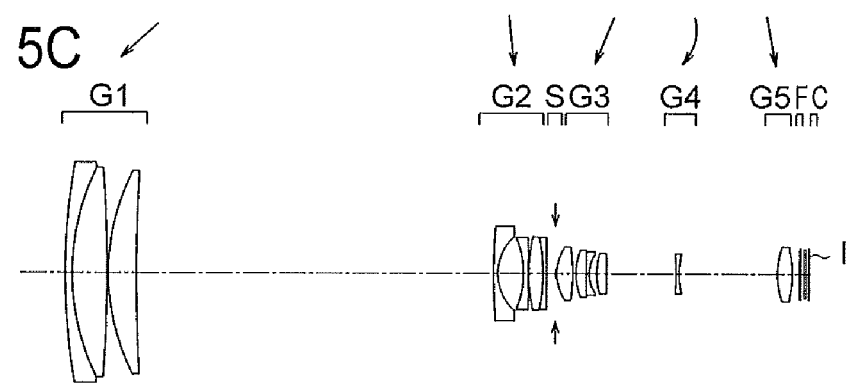

A zoom lens according to the example 5, as shown in FIG. 5A, FIG. 5B, and FIG. 5C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a planoconcave negative lens L7. Here, the biconvex positive lens L6 and the planoconcave negative lens L7 are cemented.

The third lens unit G3 includes a biconvex positive lens L8, a biconvex positive lens L9, a biconcave negative lens L10, and a biconvex positive lens L11. Here, the biconvex positive lens L9 and the biconcave negative lens L10 are cemented.

The fourth lens unit G4 includes a biconcave negative lens L12.

The fifth lens unit G5 includes a biconvex positive lens L13.

At the time of zooming from a wide angle end to a telephoto end, each lens unit moves as follows. The first lens unit G1 moves toward the object side. The second lens unit G2 moves toward an image side. The third lens unit G3 moves toward the object side. The fourth lens unit G4, during an interval from the wide angle end to an intermediate focal length state 2, after moving toward the object side, moves toward the image side and, during an interval from the intermediate focal length state 2 to the telephoto end, after moving toward the image side, moves toward the object side. The fifth lens unit G5 moves toward the image side. The aperture stop (stop) S moves toward the object side together with the third lens unit G3.

At the time of correction of image blur, the third lens unit moves in a direction orthogonal to an optical axis. Moreover, at the time of focusing, the fourth lens unit G4 moves along the optical axis.

An aspheric surface is provided to a total of six surfaces namely, both surfaces of the biconcave negative lens L5, both surfaces of the biconvex positive lens L8, and both surfaces of the biconvex positive lens L13.

Figure 6A:
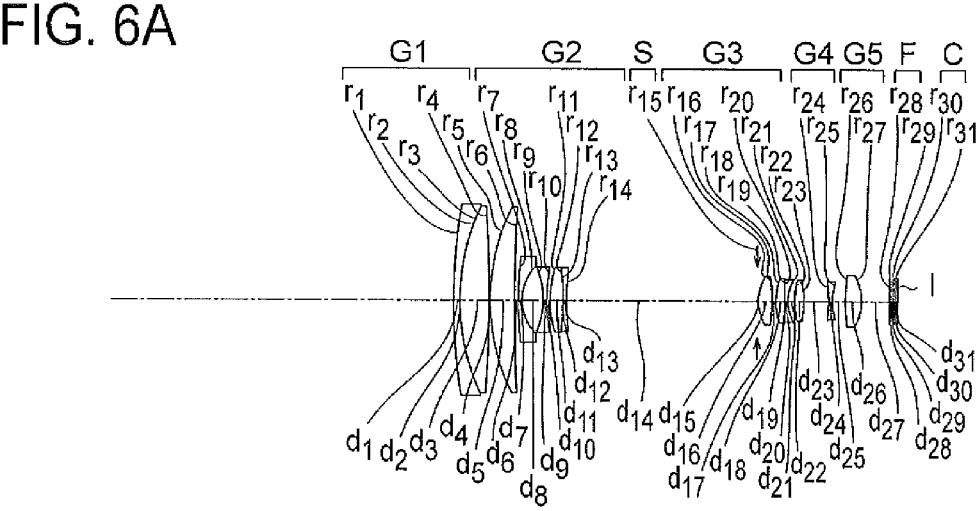
FIG. 6A, FIG. 6B, and FIG. 6C are lens cross-sectional views at the time of infinite object point focusing of a zoom lens according to an example 6, where.
Figure 6B:
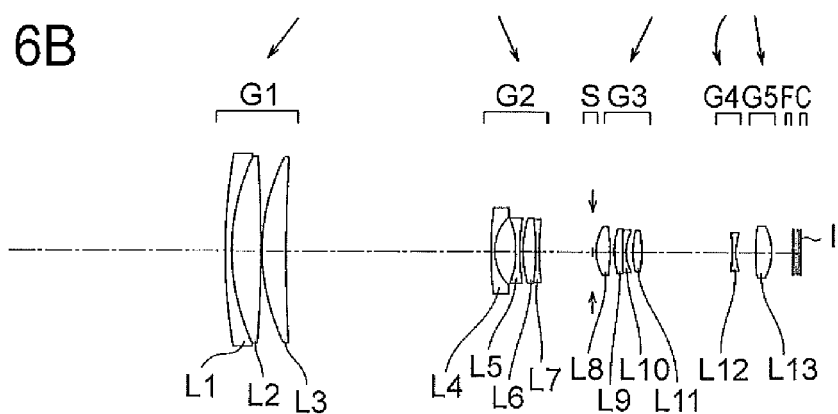
Figure 6C:
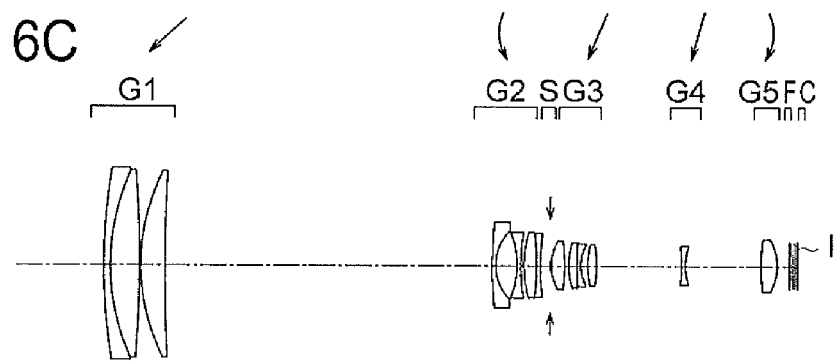

A zoom lens according to the example 6, as shown in FIG. 6A, FIG. 6B, and FIG. 6C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop (stop) S is disposed on the object side of the third lens unit G3.

The first lens unit G1 includes a negative meniscus lens L1 having a convex surface directed toward the object side, a biconvex positive lens L2, and a positive meniscus lens L3 having a convex surface directed toward the object side. S-LAH55V (manufactured by Ohara Inc.) is used in the negative meniscus lens L1.

The second lens unit G2 includes a negative meniscus lens L4 having a convex surface directed toward the object side, a biconcave negative lens L5, a biconvex positive lens L6, and a planoconcave negative lens L7. Here, the biconvex positive lens L6 and the planoconcave negative lens L7 are cemented.

The third lens unit G3 includes a biconvex positive lens L8, a positive meniscus lens L9 having a convex surface directed toward the object side, a negative meniscus lens L10 having a convex surface directed toward the object side, and a biconvex positive lens L11. Here, the positive meniscus lens L9 and the negative meniscus lens L10 are cemented.

The fourth lens unit G4 includes a biconcave negative lens L12.

The fifth lens unit G5 includes a biconvex positive lens L13.

At the time of zooming from a wide angle end to a telephoto end, each lens unit moves as follows. The first lens unit G1 moves toward the object side. The second lens unit G2, during an interval from the wide angle end to an intermediate focal length state 2, moves toward the image side and, during an interval from the intermediate focal length state 2 to the telephoto end, after moving toward the object side, moves toward the image side. The third lens unit G3 moves toward the object side. The fourth lens unit G4, during the interval from the wide angle end to the intermediate focal length state 2, after moving toward the object side, moves toward the image side and, during the interval from the intermediate focal length state 2 to the telephoto end, moves toward the object side. The fifth lens unit G5, during the interval from the wide angle end to the intermediate focal length state, moves toward the image side and, during the interval from the intermediate focal length state 2 to the telephoto end, after moving toward the image side, moves toward the object side. The aperture stop (stop) S moves toward the object side together with the third lens unit G3.

At the time of correction of image blur, the third lens unit moves in a direction orthogonal to the optical axis. Moreover, at the time of focusing, the fourth lens unit G4 moves along the optical axis.

An aspheric surface is provided to a total of six surfaces namely, both surfaces of the biconcave negative lens L5, both surfaces of the biconvex positive lens L8, and both surfaces of the biconvex positive lens L13.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus, Lens total length is a distance from the frontmost lens surface to the rearmost lens surface plus back focus and each of f1, f2 . . . is a focal length of each lens unit. Further, FB is a unit which is expressed upon air conversion of a distance from the lens backmost surface to a paraxial image surface. Further, as described hereinafter, a value of IH in each example is different from a value which is shown in aberration diagram. A value of the half angle of view is a value when image height equal to the value of IH. The image plane can be regarded as the image pickup surface.

Further, WE denotes a wide angle end, ST1 denotes a intermediate focal length state 1, ST2 denotes a intermediate focal length state 2, ST3 denotes a intermediate focal length state 3, TE denotes a telephoto end. Here, ST1 is a focal length state between WE and ST2, and standard 3 is a focal length state between ST2 and TE. During actual zooming from the wide angle end to the telephoto end, a focal length varies in order from the wide angle end, the intermediate focal length state 1, the intermediate focal length state 2, the intermediate focal length state 3, and the telephoto end.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e–n' (where, n is an integral number) indicates '$10^{-10}$'. Moreover, these symbols are commonly used in the following numerical data for each example.

EXAMPLE 1

Unit mm

Surface data

| Surface no. | r | d | nd | νd |
|---|---|---|---|---|
| Object plane | ∞ | ∞ | | |
| 1 | 126.709 | 1.40 | 1.83481 | 42.73 |
| 2 | 47.985 | 0.01 | 1.56384 | 60.67 |
| 3 | 47.985 | 6.75 | 1.49700 | 81.54 |
| 4 | −275.785 | 0.25 | | |
| 5 | 45.125 | 5.45 | 1.49700 | 81.54 |
| 6 | 378.115 | Variable | | |
| 7 | 218.051 | 0.80 | 1.88300 | 40.76 |
| 8 | 9.760 | 4.91 | | |
| 9* | −21.176 | 0.90 | 1.74156 | 49.21 |
| 10* | 296.526 | 0.15 | | |
| 11 | 24.570 | 2.86 | 1.92286 | 18.90 |
| 12 | −79.930 | 0.01 | 1.56384 | 60.67 |
| 13 | −79.930 | 0.75 | 1.83481 | 42.73 |
| 14 | 66.813 | Variable | | |
| 15 (Stop) | ∞ | 0.30 | | |
| 16* | 9.354 | 2.97 | 1.58233 | 59.30 |
| 17* | −32.203 | 0.70 | | |
| 18 | 11.600 | 2.28 | 1.53996 | 59.46 |
| 19 | 333.982 | 0.01 | 1.56384 | 60.67 |
| 20 | 333.982 | 0.50 | 1.90366 | 31.32 |
| 21 | 7.491 | 1.52 | | |
| 22 | 18.755 | 1.65 | 1.49700 | 81.54 |
| 23 | −54.592 | Variable | | |
| 24 | 591.522 | 1.40 | 1.63493 | 23.90 |
| 25 | −34.512 | 0.33 | | |
| 26 | −19.822 | 0.85 | 1.53071 | 55.69 |
| 27* | 13.494 | Variable | | |
| 28 | 22.965 | 0.80 | 1.63493 | 23.90 |
| 29 | 14.617 | 0.20 | | |
| 30 | 15.306 | 2.80 | 1.53071 | 55.69 |
| 31* | −15.539 | Variable | | |
| 32 | ∞ | 0.30 | 1.51633 | 64.14 |
| 33 | ∞ | 0.53 | | |
| 34 | ∞ | 0.50 | 1.51633 | 64.14 |
| 35 | ∞ | 0.53 | | |
| Image plane | ∞ | | | |

Aspherical surface data

9th surface
k = 0.000
A4 = 2.29902e−05, A6 = −2.09575e−09

10th surface
k = 0.000
A4 = 7.66117e−06

16th surface
k = 0.000
A4 = −1.29610e−04, A6 = −1.08073e−06, A8 = −2.00539e−08

17th surface
k = 0.000
A4 = 5.27185e−05, A6 = −1.01086e−06

27th surface
k = 0.000
A4 = −5.00000e−07

31th surface
k = 0.000
A4 = 1.36005e−04

Zoom data

| Zoom ratio | 54.72 | | | | |
|---|---|---|---|---|---|
| | WE | ST2 | TE | ST1 | ST3 |
| f | 4.75 | 35.09 | 259.93 | 12.88 | 95.55 |
| FNO. | 3.47 | 5.48 | 6.62 | 4.07 | 5.79 |
| 2ω | 83.18 | 12.32 | 1.70 | 32.77 | 4.60 |
| IH | 3.67 | 3.91 | 3.91 | 3.91 | 3.91 |
| FB (in air) | 8.09 | 5.36 | 2.92 | 7.04 | 2.97 |

Lens total length (in air)

| | | | | | |
|---|---|---|---|---|---|
| | 95.33 | 118.96 | 144.72 | 102.65 | 136.82 |
| d6 | 0.80 | 39.89 | 69.17 | 20.68 | 59.26 |
| d14 | 42.08 | 11.94 | 2.00 | 22.53 | 7.93 |
| d23 | 2.13 | 17.02 | 9.18 | 7.49 | 18.18 |
| d27 | 1.70 | 4.23 | 20.93 | 4.39 | 7.96 |
| d31 | 6.50 | 3.75 | 1.29 | 5.45 | 1.36 |

Unit focal length

| f1 = 90.05 | f2 = −9.80 | f3 = 16.25 | f4 = −21.59 | f5 = 19.34 |
|---|---|---|---|---|

EXAMPLE 2

Unit mm

Surface data

| Surface no. | r | d | nd | νd |
|---|---|---|---|---|
| Object plane | ∞ | ∞ | | |
| 1 | 120.030 | 1.40 | 1.83481 | 42.73 |
| 2 | 46.666 | 0.01 | 1.56384 | 60.67 |

-continued

Unit mm

| | | | | |
|---|---|---|---|---|
| 3 | 46.666 | 6.65 | 1.49700 | 81.54 |
| 4 | −307.607 | 0.25 | | |
| 5 | 44.247 | 5.50 | 1.49700 | 81.54 |
| 6 | 358.534 | Variable | | |
| 7 | 128.536 | 0.80 | 1.88300 | 40.76 |
| 8 | 9.812 | 5.06 | | |
| 9* | −19.316 | 0.90 | 1.74156 | 49.21 |
| 10* | 101.738 | 0.15 | | |
| 11 | 35.558 | 2.77 | 1.92286 | 18.90 |
| 12 | −35.558 | 0.01 | 1.56384 | 60.67 |
| 13 | −35.558 | 0.75 | 1.83481 | 42.73 |
| 14 | ∞ | Variable | | |
| 15 (Stop) | ∞ | 0.30 | | |
| 16* | 9.143 | 3.06 | 1.58233 | 59.30 |
| 17* | −31.376 | 0.68 | | |
| 18 | 11.500 | 1.91 | 1.53996 | 59.46 |
| 19 | 77.038 | 0.01 | 1.56384 | 60.67 |
| 20 | 77.038 | 0.65 | 1.90366 | 31.32 |
| 21 | 7.149 | 1.50 | | |
| 22 | 14.756 | 1.96 | 1.49700 | 81.54 |
| 23 | −3571.103 | Variable | | |
| 24 | ∞ | 1.40 | 1.63493 | 23.90 |
| 25 | −141.100 | 0.37 | | |
| 26 | −31.228 | 0.85 | 1.53071 | 55.69 |
| 27 | 13.938 | Variable | | |
| 28* | 17.500 | 2.90 | 1.53071 | 55.69 |
| 29* | −15.547 | Variable | | |
| 30 | ∞ | 0.30 | 1.51633 | 64.14 |
| 31 | ∞ | 0.53 | | |
| 32 | ∞ | 0.50 | 1.51633 | 64.14 |
| 33 | ∞ | 0.53 | | |
| Image plane | ∞ | | | |

Aspherical surface data

9th surface k = 0.000
A4 = −1.09097e−04,  A6 = 7.86217e−07,  A8 = 2.15451e−09

10th surface k = 0.000
A4 = −1.20797e−04,  A6 = 1.21790e−06

16th surface k = 0.000
A4 = −1.29078e−04,  A6 = −1.01340e−06,  A8 = −1.75648e−08

17th surface k = 0.000
A4 = 6.43404e−05,  A6 = −7.13720e−07

28th surface k = 0.000
A4 = 1.19109e−04,  A6 = −8.59233e−06,  A8 = 3.12339e−07

29th surface k = 0.000
A4 = 4.20533e−04,  A6 = −1.45565e−05,  A8 = 4.31599e−07

Zoom data

| Zoom ratio | 55.01 | | | | |
|---|---|---|---|---|---|
| | WE | ST2 | TE | ST1 | ST3 |
| f | 4.76 | 35.08 | 261.83 | 12.88 | 95.56 |
| FNO. | 3.47 | 5.45 | 6.62 | 4.13 | 5.86 |
| 2ω | 82.66 | 12.23 | 1.67 | 32.50 | 4.57 |
| IH | 3.64 | 3.91 | 3.91 | 3.91 | 3.91 |
| FB (in air) | 6.73 | 5.04 | 3.49 | 6.00 | 3.07 |

Lens total length (in air)

| | | | | | |
|---|---|---|---|---|---|
| | 95.33 | 121.14 | 144.71 | 105.39 | 137.99 |
| d6 | 0.80 | 40.66 | 68.06 | 21.28 | 58.61 |
| d14 | 41.54 | 12.82 | 1.60 | 23.63 | 8.67 |
| d23 | 3.24 | 16.81 | 12.54 | 7.76 | 18.49 |

-continued

Unit mm

| | | | | | |
|---|---|---|---|---|---|
| d27 | 3.18 | 5.97 | 19.18 | 6.87 | 9.32 |
| d29 | 5.14 | 3.45 | 1.87 | 4.42 | 1.50 |

Unit focal length f1 = 89.06   f2 = −9.54   f3 = 16.39   f4 = −19.71   f5 = 16.00

EXAMPLE 3

Unit mm

Surface data

| Surface no. | r | d | nd | vd |
|---|---|---|---|---|
| Object plane | ∞ | ∞ | | |
| 1 | 120.031 | 1.40 | 1.83481 | 42.73 |
| 2 | 46.922 | 0.01 | 1.56384 | 60.67 |
| 3 | 46.922 | 6.65 | 1.49700 | 81.54 |
| 4 | −329.605 | 0.25 | | |
| 5 | 44.839 | 5.50 | 1.49700 | 81.54 |
| 6 | 380.838 | Variable | | |
| 7 | 139.069 | 0.80 | 1.88300 | 40.76 |
| 8 | 9.506 | 4.97 | | |
| 9* | −20.883 | 0.90 | 1.74156 | 49.21 |
| 10* | 93.656 | 0.15 | | |
| 11 | 35.537 | 2.73 | 1.92286 | 18.90 |
| 12 | −35.537 | 0.01 | 1.56384 | 60.67 |
| 13 | −35.537 | 0.75 | 1.83481 | 42.73 |
| 14 | ∞ | Variable | | |
| 15 (Stop) | ∞ | 0.30 | | |
| 16* | 8.770 | 3.10 | 1.58233 | 59.30 |
| 17* | −32.598 | 0.60 | | |
| 18 | 11.500 | 1.83 | 1.53996 | 59.46 |
| 19 | 64.409 | 0.01 | 1.56384 | 60.67 |
| 20 | 64.409 | 0.50 | 1.90366 | 31.32 |
| 21 | 7.000 | 1.52 | | |
| 22 | 14.664 | 1.93 | 1.49700 | 81.54 |
| 23 | −545.110 | Variable | | |
| 24 | −42.891 | 0.60 | 1.58313 | 59.38 |
| 25 | 13.404 | 0.01 | 1.56384 | 60.67 |
| 26 | 13.404 | 1.06 | 1.64769 | 33.79 |
| 27 | 15.184 | Variable | | |
| 28* | 17.500 | 2.90 | 1.53071 | 55.69 |
| 29* | −16.424 | Variable | | |
| 30 | ∞ | 0.30 | 1.51633 | 64.14 |
| 31 | ∞ | 0.53 | | |
| 32 | ∞ | 0.50 | 1.51633 | 64.14 |
| 33 | ∞ | 0.53 | | |
| Image plane | ∞ | | | |

Aspherical surface data

9th surface k = 0.000
A4 = −1.35873e−04,  A6 = 8.58928e−07,  A8 = 3.21007e−09

10th surface k = 0.000
A4 = −1.53459e−04,  A6 = 1.33857e−06

16th surface k = 0.000
A4 = −1.41136e−04,  A6 = −9.04879e−07,  A8 = −1.99592e−08

17th surface k = 0.000
A4 = 6.94959e−05,  A6 = −3.89422e−07

28th surface k = 0.000
A4 = 4.58752e−05,  A6 = −7.85596e−06,  A8 = 2.10231e−07

Unit mm

29th surface k = 0.000
A4 = 3.21304e−04, A6 = −1.27334e−05, A8 = 2.94771e−07

Zoom data

| Zoom ratio | 54.81 | | | | |
|---|---|---|---|---|---|
| | WE | ST2 | TE | ST1 | ST3 |
| f | 4.76 | 35.08 | 260.91 | 12.88 | 95.55 |
| FNO. | 3.47 | 5.54 | 6.62 | 4.17 | 5.87 |
| 2ω | 82.67 | 12.25 | 1.67 | 32.55 | 4.56 |
| IH | 3.64 | 3.91 | 3.91 | 3.91 | 3.91 |
| FB (in air) | 6.82 | 4.97 | 3.43 | 5.95 | 3.07 |

Lens total length (in air)

| | | | | | |
|---|---|---|---|---|---|
| | 95.33 | 122.69 | 144.72 | 105.15 | 138.05 |
| d6 | 0.80 | 41.95 | 69.30 | 21.59 | 59.66 |
| d14 | 41.84 | 13.67 | 1.60 | 23.63 | 8.35 |
| d23 | 4.22 | 15.91 | 13.77 | 8.81 | 19.93 |
| d27 | 3.19 | 7.71 | 18.15 | 6.70 | 8.57 |
| d29 | 5.23 | 3.38 | 1.80 | 4.38 | 1.50 |

Unit focal length

| f1 = 90.20 | f2 = −9.51 | f3 = 16.32 | f4 = −19.28 | f5 = 16.45 |
|---|---|---|---|---|

EXAMPLE 4

Unit mm

Surface data

| Surface no. | r | d | nd | vd |
|---|---|---|---|---|
| Object plane | ∞ | ∞ | | |
| 1 | 120.457 | 1.40 | 1.83481 | 42.73 |
| 2 | 46.107 | 0.01 | 1.56384 | 60.67 |
| 3 | 46.107 | 6.70 | 1.49700 | 81.54 |
| 4 | −292.510 | 0.25 | | |
| 5 | 43.809 | 5.35 | 1.49700 | 81.54 |
| 6 | 364.455 | Variable | | |
| 7 | 126.352 | 0.80 | 1.88300 | 40.76 |
| 8 | 9.532 | 4.43 | | |
| 9 | −24.685 | 0.80 | 1.74156 | 49.21 |
| 10* | 27.857 | 0.82 | | |
| 11 | 21.305 | 2.71 | 1.92286 | 18.90 |
| 12 | −104.232 | 0.01 | 1.56384 | 60.67 |
| 13 | −104.232 | 0.75 | 1.83481 | 42.73 |
| 14 | 104.232 | Variable | | |
| 15 (Stop) | ∞ | 0.30 | | |
| 16* | 10.194 | 2.70 | 1.58233 | 59.30 |
| 17* | −67.288 | 1.57 | | |
| 18 | 13.039 | 1.80 | 1.51633 | 64.14 |
| 19 | 65.545 | 0.01 | 1.56384 | 60.67 |
| 20 | 65.545 | 0.75 | 1.90366 | 31.32 |
| 21 | 8.184 | 1.50 | | |
| 22 | 13.882 | 1.90 | 1.49700 | 81.54 |
| 23 | −36.279 | Variable | | |
| 24 | −37.684 | 0.80 | 1.51633 | 64.14 |
| 25 | 12.000 | Variable | | |
| 26* | 14.946 | 3.08 | 1.53071 | 55.69 |
| 27* | −17.484 | Variable | | |
| 28 | ∞ | 0.30 | 1.51633 | 64.14 |
| 29 | ∞ | 0.53 | | |
| 30 | ∞ | 0.50 | 1.51633 | 64.14 |
| 31 | ∞ | 0.53 | | |
| Image plane | ∞ | | | |

Unit mm

Aspherical surface data

10th surface k = 0.000
A4 = −9.94201e−06, A6 = 2.48173e−07

16th surface k = 0.000
A4 = −6.81118e−05, A6 = −6.74071e−08, A8 = 4.69153e−09

17th surface k = 0.000
A4 = 5.17518e−05, A6 = 2.30808e−07, A8 = 8.08262e−09

26th surface k = 0.000
A4 = −3.07038e−05

27th surface k = 0.000
A4 = 7.94920e−05, A6 = −2.93829e−07

Zoom data

| Zoom ratio | 55.09 | | | | |
|---|---|---|---|---|---|
| | WE | ST2 | TE | ST1 | ST3 |
| f | 4.76 | 35.00 | 262.22 | 12.90 | 95.45 |
| FNO. | 3.47 | 5.30 | 6.63 | 4.09 | 5.78 |
| 2ω | 82.74 | 12.46 | 1.68 | 32.94 | 4.61 |
| IH | 3.64 | 3.91 | 3.91 | 3.91 | 3.91 |
| FB (in air) | 8.49 | 6.06 | 3.26 | 7.94 | 3.17 |

Lens total length (in air)

| | | | | | |
|---|---|---|---|---|---|
| | 95.73 | 124.72 | 145.23 | 103.72 | 139.76 |
| d6 | 0.80 | 43.31 | 68.15 | 21.38 | 59.26 |
| d14 | 40.21 | 12.59 | 1.84 | 20.58 | 8.39 |
| d23 | 5.23 | 20.02 | 17.04 | 12.15 | 22.83 |
| d25 | 2.57 | 4.30 | 16.50 | 3.24 | 7.67 |
| d27 | 6.90 | 4.47 | 1.69 | 6.35 | 1.60 |

Unit focal length

| f1 = 88.20 | f2 = −9.14 | f3 = 17.16 | f4 = −17.53 | f5 = 15.70 |
|---|---|---|---|---|

EXAMPLE 5

Unit mm

Surface data

| Surface no. | r | d | nd | vd |
|---|---|---|---|---|
| Object plane | ∞ | ∞ | | |
| 1 | 123.235 | 1.40 | 1.83481 | 42.73 |
| 2 | 47.421 | 0.01 | 1.56384 | 60.67 |
| 3 | 47.421 | 6.70 | 1.49700 | 81.54 |
| 4 | −300.810 | 0.25 | | |
| 5 | 44.865 | 5.40 | 1.49700 | 81.54 |
| 6 | 354.346 | Variable | | |
| 7 | 124.378 | 0.80 | 1.88300 | 40.76 |
| 8 | 9.549 | 5.04 | | |
| 9* | −21.082 | 0.90 | 1.74156 | 49.21 |
| 10* | 85.000 | 0.15 | | |
| 11 | 35.203 | 2.74 | 1.92286 | 18.90 |
| 12 | −35.203 | 0.01 | 1.56384 | 60.67 |
| 13 | −35.203 | 0.70 | 1.83481 | 42.73 |
| 14 | ∞ | Variable | | |
| 15 (Stop) | ∞ | 0.30 | | |
| 16* | 8.880 | 3.19 | 1.58233 | 59.30 |
| 17* | −30.463 | 0.60 | | |

-continued

Unit mm

| | | | | |
|---|---|---|---|---|
| 18 | 12.311 | 2.03 | 1.57099 | 50.80 |
| 19 | −309.773 | 0.01 | 1.56384 | 60.67 |
| 20 | −309.773 | 0.50 | 1.90366 | 31.32 |
| 21 | 7.154 | 1.41 | | |
| 22 | 13.880 | 1.94 | 1.49700 | 81.54 |
| 23 | −249.208 | Variable | | |
| 24 | −33.528 | 0.55 | 1.48749 | 70.23 |
| 25 | 14.440 | Variable | | |
| 26* | 17.500 | 2.90 | 1.53071 | 55.69 |
| 27* | −17.747 | Variable | | |
| 28 | ∞ | 0.30 | 1.51633 | 64.14 |
| 29 | ∞ | 0.53 | | |
| 30 | ∞ | 0.50 | 1.51633 | 64.14 |
| 31 | ∞ | 0.53 | | |
| Image plane | ∞ | | | |

Aspherical surface data

9th surface k = 0.000
A4 = −1.18299e−04, A6 = 6.14332e−07, A8 = 3.18339e−09,
A10 = −1.35221e−11

10th surface k = 0.000
A4 = −1.38000e−04, A6 = 1.09702e−06

16th surface k = 0.000
A4 = −1.34805e−04, A6 = −1.04724e−06, A8 = −1.69878e−08

17th surface k = 0.000
A4 = 6.91534e−05, A6 = −6.60048e−07, A8 = 3.74372e−09

26th surface k = 0.000
A4 = 5.10852e−05, A6 = −5.96630e−06, A8 = 1.86240e−07

27th surface k = 0.000
A4 = 2.84587e−04, A6 = −1.20457e−05, A8 = 3.77138e−07,
A10 = −2.28550e−09

Zoom data

| Zoom ratio | 55.33 | | | | |
|---|---|---|---|---|---|
| | WE | ST2 | TE | ST1 | ST3 |
| f | 4.75 | 35.08 | 262.81 | 12.88 | 95.55 |
| FNO. | 3.43 | 5.08 | 6.63 | 3.96 | 5.71 |
| 2ω | 82.67 | 12.30 | 1.67 | 32.66 | 4.58 |
| IH | 3.64 | 3.91 | 3.91 | 3.91 | 3.91 |
| FB (in air) | 7.36 | 5.40 | 3.06 | 6.55 | 3.12 |

Lens total length (in air)

| | | | | | |
|---|---|---|---|---|---|
| | 95.32 | 123.35 | 144.70 | 105.36 | 138.20 |
| d6 | 0.80 | 43.57 | 69.73 | 21.66 | 60.55 |
| d14 | 41.85 | 13.69 | 1.60 | 23.53 | 8.57 |
| d23 | 3.78 | 15.78 | 13.55 | 8.40 | 19.23 |
| d25 | 4.03 | 7.41 | 19.25 | 7.72 | 9.21 |
| d27 | 5.77 | 3.81 | 1.45 | 4.98 | 1.55 |

Unit focal length

| | | | | |
|---|---|---|---|---|
| f1 = 90.65 | f2 = −9.59 | f3 = 16.32 | f4 = −20.63 | f5 = 17.09 |

EXAMPLE 6

Unit mm

Surface data

| Surface no. | r | d | nd | νd |
|---|---|---|---|---|
| Object plane | ∞ | ∞ | | |
| 1 | 127.380 | 1.40 | 1.83481 | 42.73 |
| 2 | 48.580 | 0.01 | 1.56384 | 60.67 |
| 3 | 48.580 | 6.34 | 1.49700 | 81.54 |
| 4 | −289.655 | 0.25 | | |
| 5 | 45.923 | 5.24 | 1.49700 | 81.54 |
| 6 | 379.192 | Variable | | |
| 7 | 87.031 | 0.80 | 1.88300 | 40.76 |
| 8 | 10.488 | 4.69 | | |
| 9* | −17.936 | 0.80 | 1.74156 | 49.21 |
| 10* | 48.262 | 0.64 | | |
| 11 | 23.670 | 2.79 | 1.92286 | 18.90 |
| 12 | −56.408 | 0.01 | 1.56384 | 60.67 |
| 13 | −56.408 | 0.75 | 1.83481 | 42.73 |
| 14 | 56.408 | Variable | | |
| 15 (Stop) | ∞ | 0.30 | | |
| 16* | 9.997 | 3.00 | 1.58233 | 59.30 |
| 17* | −34.748 | 0.89 | | |
| 18 | 16.634 | 1.80 | 1.51633 | 64.14 |
| 19 | 157.604 | 0.01 | 1.56384 | 60.67 |
| 20 | 157.604 | 0.75 | 1.90366 | 31.32 |
| 21 | 9.199 | 1.50 | | |
| 22 | 19.201 | 1.90 | 1.49700 | 81.54 |
| 23 | −25.214 | Variable | | |
| 24 | −28.386 | 0.80 | 1.51633 | 64.14 |
| 25 | 12.361 | Variable | | |
| 26* | 35.139 | 3.50 | 1.53071 | 55.69 |
| 27* | −10.639 | Variable | | |
| 28 | ∞ | 0.30 | 1.51633 | 64.14 |
| 29 | ∞ | 0.53 | | |
| 30 | ∞ | 0.50 | 1.51633 | 64.14 |
| 31 | ∞ | 0.53 | | |
| Image plane | ∞ | | | |

Aspherical surface data

9th surface k = 0.000
A4 = −3.12515e−07, A6 = 6.88464e−09

10th surface k = 0.000
A4 = 4.81090e−06, A6 = 3.07240e−07

16th surface k = 0.000
A4 = −1.07188e−04, A6 = −5.71821e−07, A8 = −1.77164e−08

17th surface k = 0.000
A4 = 6.75659e−05, A6 = −6.82365e−07, A8 = −6.10270e−09

26th surface k = 0.000
A4 = −1.10886e−04

27th surface k = 0.000
A4 = 1.80535e−04, A6 = 1.72193e−07

Zoom data

| Zoom ratio | 60.07 | | | | |
|---|---|---|---|---|---|
| | WE | ST2 | TE | ST1 | ST3 |
| f | 4.61 | 35.74 | 276.93 | 12.84 | 99.52 |
| FNO. | 3.47 | 5.00 | 6.90 | 3.94 | 5.99 |
| 2ω | 84.47 | 11.92 | 1.59 | 32.42 | 4.39 |

-continued

| Unit mm | | | | | |
|---|---|---|---|---|---|
| IH | 3.64 | 3.91 | 3.91 | 3.91 | 3.91 |
| FB (in air) | 7.70 | 6.14 | 4.23 | 7.20 | 3.96 |

| Lens total length (in air) | | | | | |
|---|---|---|---|---|---|
| | 96.05 | 124.70 | 150.23 | 101.05 | 142.16 |
| d6 | 0.80 | 44.49 | 70.96 | 19.50 | 61.22 |
| d14 | 41.09 | 11.96 | 2.00 | 20.03 | 7.79 |
| d23 | 5.49 | 19.65 | 18.38 | 12.13 | 22.96 |
| d25 | 2.81 | 4.30 | 16.50 | 4.03 | 8.07 |
| d27 | 6.11 | 4.55 | 2.64 | 5.62 | 2.37 |

| Unit focal length | | | | |
|---|---|---|---|---|
| f1 = 91.95 | f2 = −8.74 | f3 = 16.21 | f4 = −16.57 | f5 = 15.81 |

Aberration diagrams of the examples from the example 1 to the example 6 are shown in diagrams from FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L (hereinafter, 'FIG. 7A to FIG. 7L') to FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L'). Each of the aberration diagrams is an aberration diagram when focused to an object at infinity. Moreover, in each diagram, 'FIY' indicates the maximum image height.

In the aberration diagrams, diagrams from FIG. 7A, FIG. 8A, FIG. 9A, FIG. 10A, FIG. 11A, and FIG. 12A to FIG. 7D, FIG. 8D, FIG. 9D, FIG. 10D, FIG. 11D, and FIG. 12D are aberration diagrams at a wide angle end. FIG. 7A, FIG. 8A, FIG. 9A, FIG. 10A, FIG. 11A, and FIG. 12A show a spherical aberration (SA), FIG. 7B, FIG. 8B, FIG. 9B, FIG. 10B, FIG. 11B, and FIG. 12B show an astigmatism (AS), FIG. 7C, FIG. 8C, FIG. 9C, FIG. 10C, FIG. 11C, and FIG. 12C show a distortion (DT), and FIG. 7D, FIG. 8D, FIG. 9D, FIG. 10D, FIG. 11D, and FIG. 12D show a chromatic aberration of magnification (CC).

Moreover, diagrams from FIG. 7E, FIG. 8E, FIG. 9E, FIG. 10E, FIG. 11E, and FIG. 12E to FIG. 7H, FIG. 8H, FIG. 9H, FIG. 10H, FIG. 11H, and FIG. 12H are aberration diagrams in an intermediate focal length state 2. FIG. 7E, FIG. 8E, FIG. 9E, FIG. 10E, FIG. 11E, and FIG. 12E show a spherical aberration (SA), FIG. 7F, FIG. 8F, FIG. 9F, FIG. 10F, FIG. 11F, and FIG. 12F shows an astigmatism (AS), FIG. 7G, FIG. 8G, FIG. 9G, FIG. 10G, FIG. 11G, and FIG. 12G show a distortion (DT), and FIG. 7H, FIG. 8H, FIG. 9H, FIG. 10H, FIG. 11H, and FIG. 12H show a chromatic aberration of magnification (CC).

Moreover, diagrams from FIG. 7I, FIG. 8I, FIG. 9I, FIG. 10I, FIG. 11I, and FIG. 12I to FIG. 7L, FIG. 8L, FIG. 9L, FIG. 10L, FIG. 11L, and FIG. 12L are aberration diagrams at a telephoto end. FIG. 7I, FIG. 8I, FIG. 9I, FIG. 10I, FIG. 11I, and FIG. 12I show a spherical aberration (SA), FIG. 7J, FIG. 8J, FIG. 9J, FIG. 10J, FIG. 11J, and FIG. 12J show an astigmatism (AS), FIG. 7K, FIG. 8K, FIG. 9K, FIG. 10K, FIG. 11K, and FIG. 12K show a distortion (DT), and FIG. 7L, FIG. 8L, FIG. 9L, FIG. 10L, FIG. 11L, and FIG. 12L show a chromatic aberration of magnification (CC).

Values of FIY in the aberration diagrams are higher than values of IH in numerical examples. This is because, the value of FIY is the image height when there is a camera-shake, whereas, the value of IH is the image height when there is no camera-shake.

In a case in which, there is no camera-shake, an optical image is formed in a predetermined area of the image pickup element (image pickup surface). Whereas, when there is a camera-shake, the optical image is shifted in various directions, with the predetermined area as a center. Therefore, an area (image height) in which the optical image is formed becomes wider in a case in which, there is a camera-shake (FIY) as compared to the area in which the optical image is formed in a case in which, there is no camera-shake (IH).

In a case of carrying out the correction of camera-shake by moving the image pickup element, it is preferable that the aberration of the optical system is corrected to the maximum of the area in which, the optical image is shifted. Therefore, in the aberration diagrams, the aberration up to the maximum area in which, the optical image is shifted, is shown.

Next, the values of conditional expressions (1) to (11) in each example are shown below.

| | Example 1 | Example 2 | Example 3 |
|---|---|---|---|
| (1) $mg_{3t}/mg_{3w}$ | 2.389 | 2.667 | 2.702 |
| (2) $mg_{5t}/mg_{5w}$ | 1.499 | 1.389 | 1.39 |
| (3) $f_5/f_t$ | 0.074 | 0.061 | 0.063 |
| (4) $f_3/f_t$ | 0.063 | 0.063 | 0.063 |
| (5) $(1 - mg_{3t}) \times mg_{4t} \times mg_{5t}$ | 3.497 | 3.501 | 3.501 |
| (6) $vd_{1n}$ | 42.73 | 42.73 | 42.73 |
| (7) $vd_{1p}$ | 81.54 | 81.54 | 81.54 |
| (8) $\theta gF_{1n}$ | 0.565 | 0.565 | 0.565 |
| (9) $f_1/f_{1c}$ | 0.124 | 0.121 | 0.117 |
| (10) $f_1/f_t$ | 0.346 | 0.340 | 0.346 |
| (11) $f_t/f_w$ | 54.72 | 55.01 | 54.81 |

| | Example 4 | Example 5 | Example 6 |
|---|---|---|---|
| (1) $mg_{3t}/mg_{3w}$ | 2.521 | 2.669 | 3.107 |
| (2) $mg_{5t}/mg_{5w}$ | 1.857 | 1.491 | 1.458 |
| (3) $f_5/f_t$ | 0.060 | 0.065 | 0.057 |
| (4) $f_3/f_t$ | 0.065 | 0.062 | 0.059 |
| (5) $(1 - mg_{3t}) \times mg_{4t} \times mg_{5t}$ | 3.500 | 3.507 | 3.923 |
| (6) $vd_{1n}$ | 42.73 | 42.73 | 42.73 |
| (7) $vd_{1p}$ | 81.54 | 81.54 | 81.54 |
| (8) $\theta gF_{1n}$ | 0.565 | 0.565 | 0.565 |
| (9) $f_1/f_{1c}$ | 0.118 | 0.121 | 0.124 |
| (10) $f_1/f_t$ | 0.336 | 0.345 | 0.332 |
| (11) $f_t/f_w$ | 55.09 | 55.33 | 60.07 |

Figure 13:
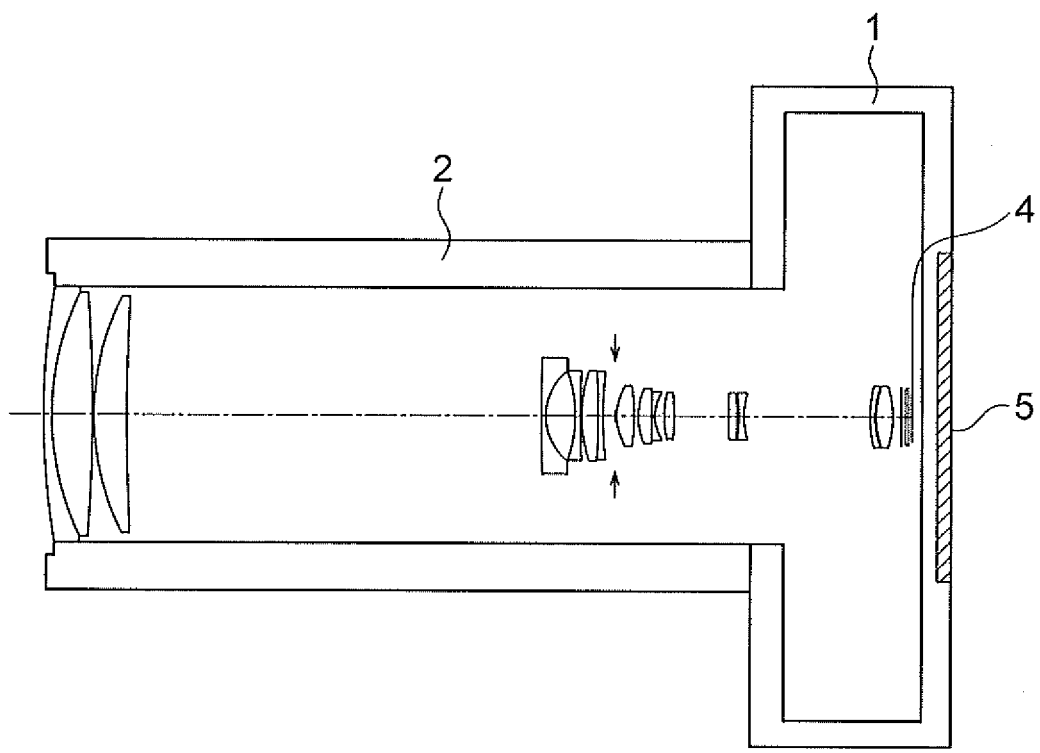
FIG. 13 is a cross-sectional view of an image pickup apparatus according to the present invention.

FIG. 13 is a cross-sectional view of a compact camera as an electronic image pickup apparatus. In FIG. 13, a photographic optical system 2 is disposed inside a lens barrel of a compact camera 1. Moreover, an image pickup element surface 4 and a back monitor 5 are disposed in a body. As an image pickup element, an element such as a small-size CCD (charge coupled device) or a CMOS (complementary metal-oxide semiconductor) is to be used.

Here, it is possible to let the photographic optical system 2 to be detachable from a single-lens mirrorless camera by providing a mounting portion to the lens barrel. As the mounting portion, for example, a screw type mount or bayonet type mount could be used.

Moreover, as the photographic optical system 2 of the compact camera 1, the zoom lens described in any one of the examples from the first example to the sixth example is to be used for instance.

Figure 14:
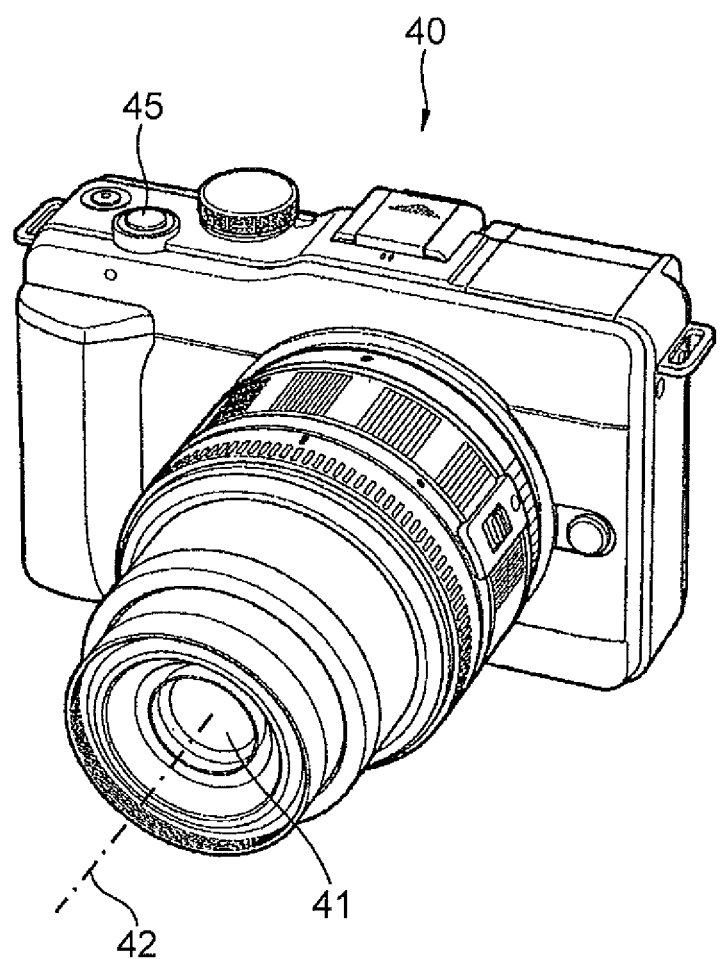
FIG. 14 is a front perspective view showing an appearance of the image pickup apparatus.
Figure 15:
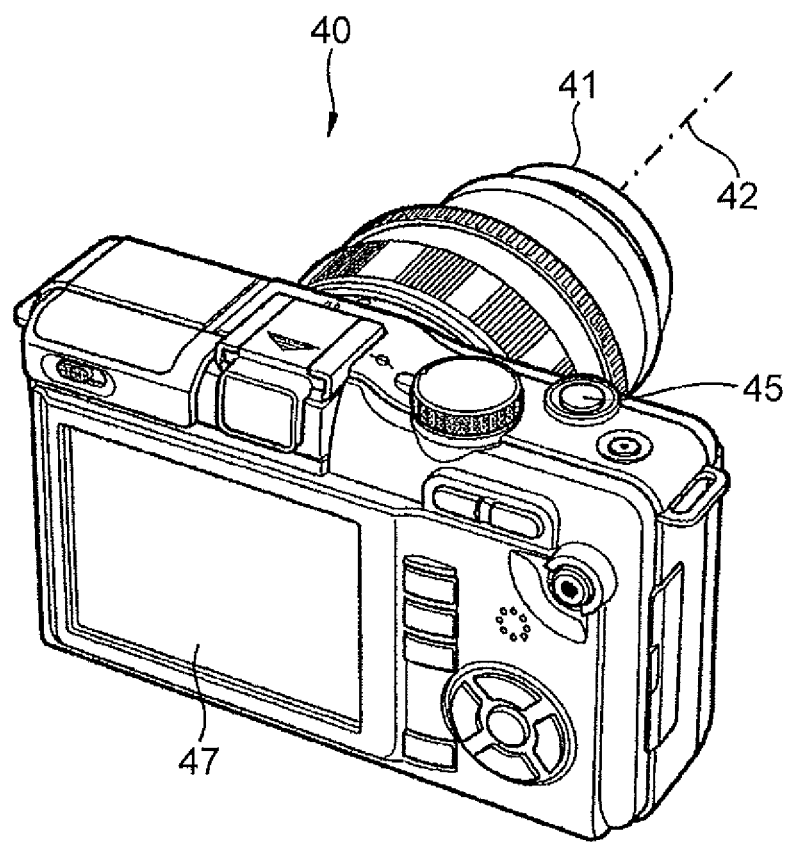
FIG. 15 is a rear perspective view of the image pickup apparatus.

FIG. 14 and FIG. 15 are conceptual diagrams of an arrangement of the image pickup apparatus according to the present embodiment. FIG. 14 is a front perspective view showing an appearance of a digital camera 40 as the image pickup apparatus, and FIG. 15 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example, for instance. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 16:
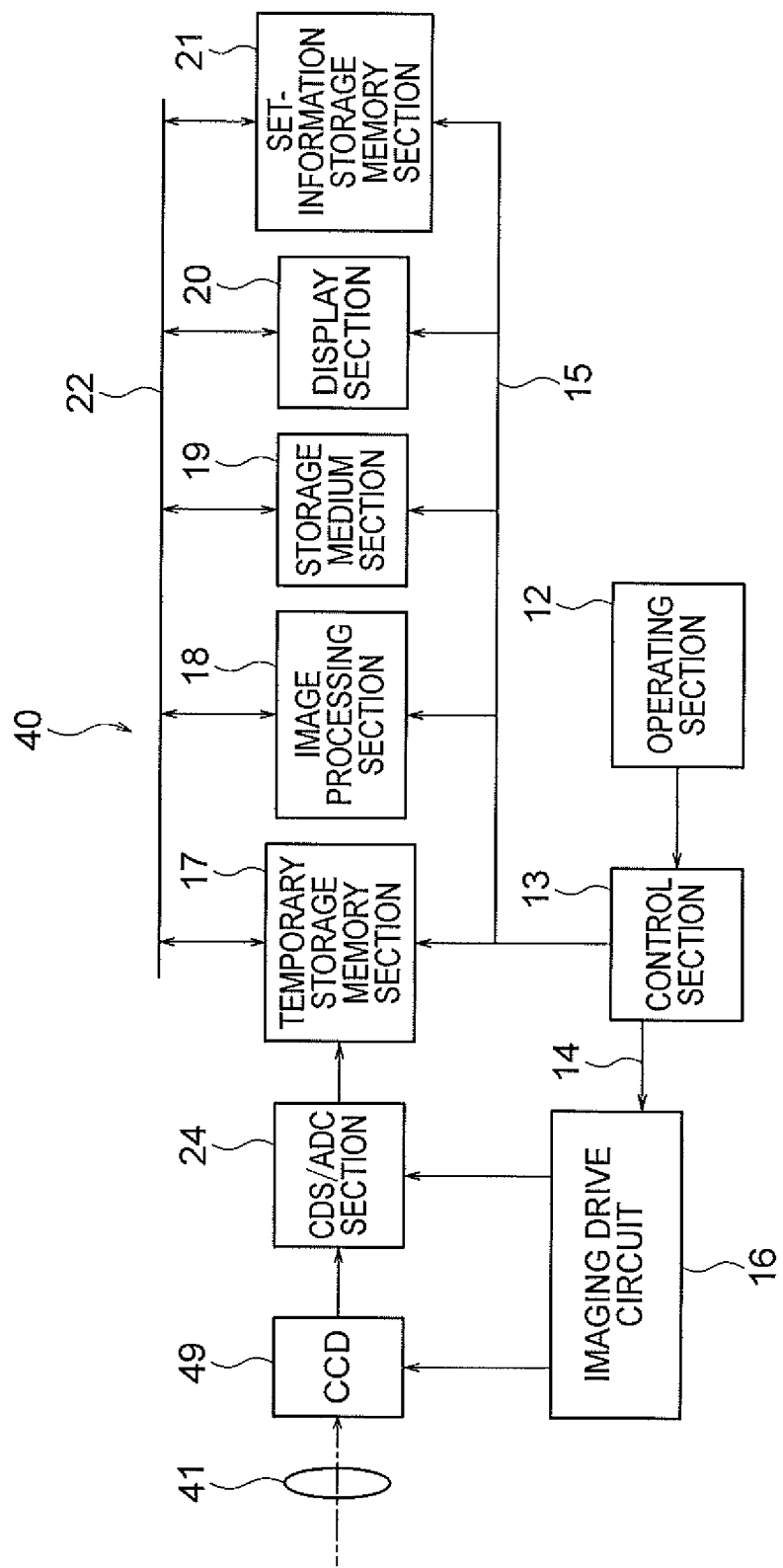
FIG. 16 is a structural block diagram of an internal circuit of main components of the image pickup apparatus.

FIG. 16 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 16, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 140 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By adopting the zoom lens according to the present example as a photographic optical system 41, it is possible to let a digital camera 40 arranged in such manner to be an image pickup apparatus which includes a zoom lens which is advantageous for small-sizing of the optical system and for securing a high zooming ratio. Moreover, it is possible to let the digital camera 40 to be an image pickup apparatus which includes a zoom lens which is advantageous for small-sizing of the optical system and for securing a high zooming ratio, and in which, it is possible to suppress easily the effect of camera-shake susceptible to occur at the telephoto end. Furthermore, it is possible to let the digital camera 40 to be an image pickup apparatus which includes a zoom lens which is advantageous for small-sizing of the optical system and for securing a high zooming ratio, and in which, it is possible to suppress easily the chromatic aberration susceptible to occur at the telephoto end.

According to the first aspect of the present invention, it is possible to provide a zoom lens in which, various aberrations are corrected favorably, and which is advantageous for small-sizing of the optical system, and for securing a high zooming ratio, and an image pickup apparatus using such zoom lens. Moreover, according to the second aspect of the present invention, it is possible to provide a zoom lens which is advantageous for small-sizing of the optical system and for securing a high zooming ratio, and in which, it is possible to suppress easily the effect of camera-shake susceptible to occur at the telephoto end, and an image pickup apparatus using such zoom lens. Furthermore, according to the third aspect of the present invention, it is possible to provide a zoom lens which is advantageous for small-sizing of the optical system and for securing a high zooming ratio, and in which, it is possible to suppress easily the chromatic aberration susceptible to occur at the telephoto end, and an image pickup apparatus using such zoom lens.

As aforementioned, the present invention is suitable for a zoom lens which is advantageous for small-sizing of the optical system, and for securing a high zooming ratio, and an image pickup apparatus using such zoom lens. Moreover, the present invention is suitable for a zoom lens which is advantageous for small-sizing of the optical system and for securing a high zooming ratio, and in which, it is possible to suppress easily the effect of camera-shake susceptible to occur at the telephoto end, and an image pickup apparatus using such zoom lens. Furthermore, the present invention is suitable for a zoom lens which is advantageous for small-sizing of the optical system and for securing high zooming ratio, and in which, it is possible to suppress easily the chromatic aberration susceptible to occur at the telephoto end, and an image pickup apparatus using such zoom lens.

What is claimed is:

1. A zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
      at the time of zooming, each of the first lens unit, the second lens unit, the third lens unit, the fourth lens unit, and the fifth lens unit moves to change distances between the lens units,
      a distance between the first lens unit and the second lens unit at a telephoto end is longer than a distance between the first lens unit and the second lens unit at a wide angle end,
      a distance between the third lens unit and the fourth lens unit at the telephoto end is longer than a distance between the third lens unit and the fourth lens unit at the wide angle end,
      a distance between the fourth lens unit and the fifth lens unit at the telephoto end is longer than a distance between the fourth lens unit and the fifth lens unit at the wide angle end,
      a distance between the second lens unit and the third lens unit at the telephoto end is shorter than a distance between the second lens unit and the third lens unit at the wide angle end, and
   the following conditional expression (11) is satisfied:

$$40 < f_t/f_w < 150 \tag{11}$$

where,
   $f_t$ denotes the focal length of the overall zoom lens system at the telephoto end, and
   $f_w$ denotes a focal length of the overall zoom lens system at a wide angle end.

2. The zoom lens according to claim 1, wherein the following conditional expression (11-1) is satisfied:

$$45 < f_t/f_w < 150 \tag{11-1}$$

where,
   $f_t$ denotes the focal length of the overall zoom lens system at the telephoto end, and
   $f_w$ denotes a focal length of the overall zoom lens system at a wide angle end.

3. The zoom lens according to claim 1, wherein the following conditional expression (11-2) is satisfied:

$$52 < f_t/f_w < 150 \tag{11-2}$$

where,
   $f_t$ denotes the focal length of the overall zoom lens system at the telephoto end, and
   $f_w$ denotes a focal length of the overall zoom lens system at a wide angle end.

4. The zoom lens according to claim 1, wherein the following conditional expression (11-3) is satisfied:

$$54.72 \leq f_t/f_w < 150 \tag{11-3}$$

where,
   $f_t$ denotes the focal length of the overall zoom lens system at the telephoto end, and
   $f_w$ denotes a focal length of the overall zoom lens system at a wide angle end.

5. The zoom lens according to claim 1, wherein the following conditional expression (11-4) is satisfied:

$$55.09 \leq f_t/f_w < 150 \tag{11-4}$$

where,
   $f_t$ denotes the focal length of the overall zoom lens system at the telephoto end, and
   $f_w$ denotes a focal length of the overall zoom lens system at a wide angle end.

6. The zoom lens according to claim 1, wherein the following conditional expression (11-5) is satisfied:

$$60.07 \leq f_t/f_w < 150 \tag{11-5}$$

where,
   $f_t$ denotes the focal length of the overall zoom lens system at the telephoto end, and
   $f_w$ denotes a focal length of the overall zoom lens system at a wide angle end.

7. The zoom lens according to claim 1, wherein the first lens unit includes a cemented lens having a negative lens and a positive lens, and at least one positive lens.

8. The zoom lens according to claim 1, wherein the first lens unit includes a cemented lens having a negative lens and a positive lens, and at least one positive lens, and
   the following conditional expression (11-3) is satisfied:

$$54.72 \leq f_t/f_w < 150 \tag{11-3}$$

where,
   $f_t$ denotes the focal length of the overall zoom lens system at the telephoto end, and
   $f_w$ denotes a focal length of the overall zoom lens system at a wide angle end.

9. The zoom lens according to claim 1, wherein the first lens unit has three lens elements, and includes in order from an object side, a negative meniscus lens having a convex surface directed toward the object side, a biconvex positive lens, and a positive meniscus lens having a convex surface directed toward the object side, and
   the negative meniscus lens of the first lens unit and the biconvex positive lens of the first lens unit are cemented.

10. The zoom lens according to claim 4, wherein the first lens unit has three lens elements, and includes in order from an object side, a negative meniscus lens having a convex surface directed toward the object side, a biconvex positive lens, and a positive meniscus lens having a convex surface directed toward the object side, and
    the negative meniscus lens of the first lens unit and the biconvex positive lens of the first lens unit are cemented.

11. The zoom lens according to claim 1, wherein the first lens unit has three lens elements, and includes in order from an object side, a negative meniscus lens having a convex surface directed toward the object side, a biconvex positive lens, and a positive meniscus lens having a convex surface directed toward the object side,
    the negative meniscus lens of the first lens unit and the biconvex positive lens of the first lens unit are cemented, and
    the following conditional expression (11-3) is satisfied:

$$54.72 \leq f_t/f_w < 150 \tag{11-3}$$

where,
    $f_t$ denotes the focal length of the overall zoom lens system at the telephoto end, and f_w denotes a focal length of the overall zoom lens system at a wide angle end.

12. The zoom lens according to claim 1, wherein
the second lens unit includes three negative lenses and one positive lens.

13. The zoom lens according to claim 12, wherein
the three negative lenses of the second lens unit include a negative meniscus lens having a convex surface directed toward the object side, a biconcave negative lens, and a biconcave negative lens, and
the one positive lens of the second lens unit includes a biconvex positive lens.

14. The zoom lens according to claim 4, wherein
the second lens unit includes three negative lenses and one positive lens.

15. The zoom lens according to claim 14, wherein
the three negative lenses of the second lens unit include a negative meniscus lens having a convex surface directed toward the object side, a biconcave negative lens, and a biconcave negative lens, and
the one positive lens of the second lens unit includes a biconvex positive lens.

16. The zoom lens according to claim 1, wherein
the first lens unit has three lens elements, and includes in order from an object side, a negative meniscus lens having a convex surface directed toward the object side, a biconvex positive lens, and a positive meniscus lens having a convex surface directed toward the object side,
the negative meniscus lens of the first lens unit and the biconvex positive lens of the first lens unit are cemented,
the second lens unit includes three negative lenses and one positive lens, and
the following conditional expression (11-3) is satisfied:

$$54.72 \leq f_t/f_w < 150 \quad (11\text{-}3)$$

where,
f_t denotes the focal length of the overall zoom lens system at the telephoto end, and
f_w denotes a focal length of the overall zoom lens system at a wide angle end.

17. The zoom lens according to claim 16, wherein
the three negative lenses of the second lens unit include a negative meniscus lens having a convex surface directed toward the object side, a biconcave negative lens, and a biconcave negative lens, and
the one positive lens of the second lens unit includes a biconvex positive lens.

18. The zoom lens according to claim 1, wherein
the third lens unit has four lens elements,
at least two lenses of the four lens elements of the third lens unit are cemented, and
in the third lens unit, a biconvex positive lens is disposed nearest to the object side.

19. The zoom lens according to claim 4, wherein
the third lens unit has four lens elements,
at least two lenses of the four lens elements of the third lens unit are cemented, and
in the third lens unit, a biconvex positive lens is disposed nearest to the object side.

20. The zoom lens according to claim 1, wherein
the first lens unit has three lens elements, and includes in order from an object side, a negative meniscus lens having a convex surface directed toward the object side, a biconvex positive lens, and a positive meniscus lens having a convex surface directed toward the object side,
the negative meniscus lens of the first lens unit and the biconvex positive lens of the first lens unit are cemented,
the second lens unit includes three negative lenses and one positive lens,
the three negative lenses of the second lens unit include a negative meniscus lens having a convex surface directed toward the object side, a biconcave negative lens, and a biconcave negative lens,
the one positive lens of the second lens unit includes a biconvex positive lens,
the third lens unit has four lens elements,
at least two lenses of the four lens elements of the third lens unit are cemented,
in the third lens unit, a biconvex positive lens is disposed nearest to the object side, and
the following conditional expression (11-3) is satisfied:

$$54.72 \leq f_t/f_w < 150 \quad (11\text{-}3)$$

where,
f_t denotes the focal length of the overall zoom lens system at the telephoto end, and
f_w denotes a focal length of the overall zoom lens system at a wide angle end.

21. The zoom lens according to claim 1, wherein
the fourth lens unit has two lens elements, and
the two lens elements of the fourth lens unit are cemented.

22. The zoom lens according to claim 4, wherein
the fourth lens unit has two lens elements, and
the two lens elements of the fourth lens unit are cemented.

23. The zoom lens according to claim 1, wherein
the first lens unit has three lens elements, and includes in order from an object side, a negative meniscus lens having a convex surface directed toward the object side, a biconvex positive lens, and a positive meniscus lens having a convex surface directed toward the object side,
the negative meniscus lens of the first lens unit and the biconvex positive lens of the first lens unit are cemented,
the second lens unit includes three negative lenses and one positive lens,
the three negative lenses of the second lens unit include a negative meniscus lens having a convex surface directed toward the object side, a biconcave negative lens, and a biconcave negative lens,
the one positive lens of the second lens unit includes a biconvex positive lens,
the third lens unit has four lens elements,
at least two lenses of the four lens elements of the third lens unit are cemented,
in the third lens unit, a biconvex positive lens is disposed nearest to the object side,
the fourth lens unit has two lens elements,
the two lens elements of the fourth lens unit are cemented, and
the following conditional expression (11-3) is satisfied:

$$54.72 \leq f_t/f_w < 150 \quad (11\text{-}3)$$

where,
f_t denotes the focal length of the overall zoom lens system at the telephoto end, and
f_w denotes a focal length of the overall zoom lens system at a wide angle end.

24. The zoom lens according to claim 1, wherein
the fifth lens unit has two lens elements, and
the two lens elements of the fifth lens unit are cemented.

25. The zoom lens according to claim 4, wherein
the fifth lens unit has two lens elements, and
the two lens elements of the fifth lens unit are cemented.

26. The zoom lens according to claim 1, wherein
the first lens unit has three lens elements, and includes in order from an object side, a negative meniscus lens having a convex surface directed toward the object side, a biconvex positive lens, and a positive meniscus lens having a convex surface directed toward the object side,
the negative meniscus lens of the first lens unit and the biconvex positive lens of the first lens unit are cemented,
the second lens unit includes three negative lenses and one positive lens,
the three negative lenses of the second lens unit include a negative meniscus lens having a convex surface directed toward the object side, a biconcave negative lens, and a biconcave negative lens,
the one positive lens of the second lens unit includes a biconvex positive lens,
the third lens unit has four lens elements,
at least two lenses of the four lens elements of the third lens unit are cemented,
in the third lens unit, a biconvex positive lens is disposed nearest to the object side,
the fourth lens unit has two lens elements,
the two lens elements of the fourth lens unit are cemented,
the fifth lens unit has two lens elements,
the two lens elements of the fifth lens unit are cemented, and
the following conditional expression (11-3) is satisfied:

$$54.72 \leq f_t/f_w < 150 \quad (11\text{-}3)$$

where,
$f_t$ denotes the focal length of the overall zoom lens system at the telephoto end, and
$f_w$ denotes a focal length of the overall zoom lens system at a wide angle end.

27. The zoom lens according to claim 1, wherein
the first lens unit and the third lens unit are positioned more on the object side at the telephoto end than at the wide angle end, and
the fifth lens unit is positioned more on the image side at the telephoto end than at the wide angle end.

28. The zoom lens according to claim 1, wherein the second lens unit is positioned more on the image side at the telephoto end than at the wide angle end.

29. The zoom lens according to claim 1, wherein the following conditional expression (1) is satisfied:

$$2 < mg_{3t}/mg_{3w} < 6 \quad (1)$$

where,
$mg_{3w}$ denotes a lateral magnification of the third lens unit at the wide angle end, and
$mg_{3t}$ denotes a lateral magnification of the third lens unit at the telephoto end.

30. The zoom lens according to claim 1, wherein the following conditional expression (3) is satisfied:

$$0.02 < f_5/f_t < 0.12 \quad (3)$$

where,
$f_5$ denotes a focal length of the fifth lens unit, and
$f_t$ denotes a focal length of the overall zoom lens system at the telephoto end.

31. The zoom lens according to claim 1, wherein the following conditional expression (4) is satisfied:

$$0.02 < f_3/f_t < 0.1 \quad (4)$$

where,
$f_3$ denotes a focal length of the third lens unit, and
$f_t$ denotes the focal length of the overall zoom lens system at the telephoto end.

32. The zoom lens according to claim 1, wherein the following conditional expression (5) is satisfied:

$$1.5 < (1-mg_{3t}) \times mg_{4t} \times mg_{5t} < 7.0 \quad (5)$$

where,
$mg_{3t}$ denotes the lateral magnification of the third lens unit at the telephoto end,
$mg_{4t}$ denotes a lateral magnification of the fourth lens unit at the telephoto end, and
$mg_{5t}$ denotes the lateral magnification of the fifth lens unit at the telephoto end.

33. The zoom lens according to claim 1, wherein the following conditional expression (6) is satisfied:

$$vd_{1n} < 50 \quad (6)$$

where,
$vd_{1n}$ denotes Abbe's number for a d-line of at least one negative lens in the first lens unit,
Abbe's number $vd_{1n}$ is indicated by $vd_{1n}=(nd_{1n}-1)/(nF_{1n}-nC_{1n})$, and
$nd_{1n}$, $ng_{1n}$, $nF_{1n}$, and $nC_{1n}$ are refractive indices for the d-line, the g-line, the F-line, and a C-line respectively, of at least one negative lens in the first lens unit.

34. The zoom lens according to claim 1, wherein the following conditional expression (7) is satisfied:

$$80 < vd_{1p} \quad (7)$$

where,
$vd_{1p}$ denotes Abbe's number for the d-line of at least one positive lens in the first lens unit,
Abbe's number $vd_{1p}$ is indicated by $vd_{1p}=(nd_{1p}-1)/(nF_{1p}-nC_{1p})$, and
$nd_{1p}$, $ng_{1p}$, $nF_{1p}$, and $nC_{1p}$ are refractive indices for the d-line, the g-line, the F-line, and the C-line respectively, of at least one positive lens in the first lens unit.

35. The zoom lens according to claim 1, wherein the first lens unit includes a negative lens which satisfies the following conditional expression (8):

$$\theta gF_{1n} < -0.00266 vd_{1n} + 0.68107 \quad (8)$$

where,
$\theta gF_{1n}$ denotes a partial dispersion ratio for a g-line and an F-line of at least one negative lens in the first lens unit,
the partial dispersion ratio $\theta gF_{1n}$ is indicated by $\theta gF_{1n}=(ng_{1n}-nF_{1n})/(nF_{1n}-nC_{1n})$, and
$nd_{1n}$, $ng_{1n}$, $nF_{1n}$, and $nC_{1n}$ are refractive indices for the d-line, the g-line, the F-line, and a C-line respectively, of at least one negative lens in the first lens unit.

36. The zoom lens according to claim 1, wherein the following conditional expression (10) is satisfied:

$$0.2 < f_1/f_t < 0.5 \quad (10)$$

where,
$f_1$ denotes a focal length of the first lens unit, and
$f_t$ denotes a focal length of the overall zoom lens system at the telephoto end.

37. An image pickup apparatus comprising:
a zoom lens; and
an image pickup element which has an image pickup surface, and which converts an image formed on the image pickup surface by the zoom lens, to an electric image, wherein
the zoom lens is the zoom lens according to claim 1.

38. The image pickup apparatus according to claim 37, comprising:
 an image converting section, wherein
 an electric signal having a distortion due to the zoom lens, is converted to an image signal in which, the distortion is corrected, by an image processing in the image converting section.

* * * * *